United States Patent
Sieger et al.

(10) Patent No.: US 12,086,520 B2
(45) Date of Patent: Sep. 10, 2024

(54) SYSTEM AND METHOD FOR MULTI-MATERIAL MESH GENERATION FROM FILL-FRACTION VOXEL DATA

(71) Applicant: Coventor, Inc., Cary, NC (US)

(72) Inventors: Daniel Sieger, Épinay sur Orge (FR); Kenneth B. Greiner, Arlington, MA (US); Daniel Faken, Peabody, MA (US); Vincent Baudet, La Mulatiere (FR); Stéphane Calderon, Saint Rémy les Chevreuse (FR)

(73) Assignee: Coventor, Inc., Cary, NC (US)

( * ) Notice: Subject to any disclaimer, the term of this patent is extended or adjusted under 35 U.S.C. 154(b) by 1040 days.

(21) Appl. No.: 16/968,856

(22) PCT Filed: Feb. 15, 2019

(86) PCT No.: PCT/US2019/018237
§ 371 (c)(1),
(2) Date: Aug. 10, 2020

(87) PCT Pub. No.: WO2019/161218
PCT Pub. Date: Aug. 22, 2019

(65) Prior Publication Data
US 2021/0012049 A1 Jan. 14, 2021

Related U.S. Application Data

(60) Provisional application No. 62/710,335, filed on Feb. 16, 2018.

(51) Int. Cl.
*G06F 30/3308* (2020.01)
*G06F 30/23* (2020.01)
(Continued)

(52) U.S. Cl.
CPC .......... *G06F 30/3308* (2020.01); *G06F 30/23* (2020.01); *G06F 2111/08* (2020.01); *G06F 2111/10* (2020.01)

(58) Field of Classification Search
CPC .. G06F 30/3308; G06F 30/23; G06F 2111/08; G06F 2111/10
(Continued)

(56) References Cited

U.S. PATENT DOCUMENTS 6,157,900 A     12/2000  Maseeh
7,876,947 B2 *   1/2011  Lee ........................... G06T 7/11
                                                              378/4

(Continued)

FOREIGN PATENT DOCUMENTS

TW        201703992 A    2/2017
WO   WO-2019161218 A1 *  8/2019 ............. G06F 30/23

OTHER PUBLICATIONS

Yuan et al. (A Mesh Generator for Tetrahedral Elements Using Delaunay Triangulation, 1993, IEEE, pp. 1906-1909) (Year: 1993).*
(Continued)

*Primary Examiner* — Iftekhar A Khan
(74) *Attorney, Agent, or Firm* — Weaver Austin Villeneuve & Sampson LLP

(57) ABSTRACT

Systems and methods for multi-material mesh generation from fill-fraction voxel model data are discussed. Voxel representations of model data are used to generate robust and accurate multi-material meshes. More particularly, a mesh generation pipeline in a virtual fabrication environment is described that robustly generates high-quality triangle surface and tetrahedral volume meshes from multi-material fill-fraction voxel data. Multi-material topology is accurately captured while preserving characteristic feature edges of the model.

23 Claims, 28 Drawing Sheets

(51) Int. Cl.
*G06F 111/08* (2020.01)
*G06F 111/10* (2020.01)

(58) Field of Classification Search
USPC .......................................................... 703/14
See application file for complete search history.

(56) References Cited

U.S. PATENT DOCUMENTS

| | | | |
|---|---|---|---|
| 8,082,137 B2 | 12/2011 | Li et al. | |
| 8,208,991 B2 * | 6/2012 | Markowitz | A61B 34/20 600/508 |
| 8,502,818 B1 * | 8/2013 | Mueller-Fischer | G06T 17/20 345/420 |
| 8,731,869 B2 * | 5/2014 | Michal | G06F 30/15 703/2 |
| 9,786,073 B2 * | 10/2017 | Fulford | G06T 11/206 |
| 10,740,525 B2 * | 8/2020 | Asenov | G06F 30/20 |
| 10,796,068 B2 * | 10/2020 | Kwon | G06N 3/08 |
| 10,839,598 B2 * | 11/2020 | Zeng | B29C 64/386 |
| 11,043,042 B2 * | 6/2021 | Del Angel | G06T 19/20 |
| 2004/0249809 A1 * | 12/2004 | Ramani | G06F 16/5854 |
| 2008/0218513 A1 * | 9/2008 | Kaus | G06T 17/20 345/423 |
| 2008/0246761 A1 * | 10/2008 | Faken | G06T 17/00 345/420 |
| 2008/0288221 A1 * | 11/2008 | Tomohiro | G06T 17/20 703/1 |
| 2012/0065755 A1 * | 3/2012 | Steingart | B33Y 30/00 700/98 |
| 2014/0282302 A1 * | 9/2014 | Greiner | G06F 30/20 716/54 |
| 2014/0282324 A1 * | 9/2014 | Greiner | G06F 30/39 716/111 |
| 2014/0324204 A1 * | 10/2014 | Vidimce | G06T 17/20 700/98 |
| 2016/0111513 A1 | 4/2016 | Liu et al. | |
| 2016/0232262 A1 * | 8/2016 | Shayani | G06F 30/20 |
| 2016/0267705 A1 * | 9/2016 | O'Leary | G06T 19/20 |
| 2017/0344683 A1 * | 11/2017 | Kamon | G06F 30/398 |
| 2017/0372513 A1 * | 12/2017 | Zeng | G06T 19/00 |
| 2018/0322623 A1 * | 11/2018 | Memo | G06N 3/084 |
| 2018/0365370 A1 * | 12/2018 | Egan | G06F 3/04815 |
| 2019/0286780 A1 * | 9/2019 | Greiner | G06F 30/39 |
| 2020/0356711 A1 * | 11/2020 | Egan | G06F 30/398 |

OTHER PUBLICATIONS

Choi et al. (A Multi-Material Virtual Prototyping System, 2003, The University of Hong Kong, pp. 138-149) (Year: 2003).*
Bérard-Bergery et al., 3D Resist Reflow Compact Model for Imager Microlens Shape Optimization. Design-Process-Technology Co-optimization for Manufacturability XIII, SPIE Proceedings vol. 10962, Mar. 20, 2019.
Chen et al., Thermal Reflow Process for Glass Microlens Manufacturing. ASME 2008 International Manufacturing Science and Engineering Conference, vol. 2, Jul. 24, 2009.
Esfandyari et al., Simulation, optimization and experimental verification of the over-pressure reflow soldering process. Procedia CIRP. 2017;62:565-70.
International Preliminary Report on Patentability and Written Opinion dated Aug. 27, 2020 in PCT Application No. PCT/US2019/018237.
International Search Report and Written Opinion dated Jun. 4, 2019 in PCT Application No. PCT/US2019/018237.
KR Office Action dated Jul. 28, 2023, in KR Application No. 10-2020-7026504 with English translation.
KR Office Action dated Nov. 29, 2022, in Application No. KR10-2020-7026504 with English translation.
TW Office Action dated Aug. 16, 2023, in application No. TW108105258 with English translation.
TW Office Action dated Jul. 5, 2022, in application No. TW108105258 with English translation.
TW Office Action dated Nov. 29, 2022, in TW Application No. 108105258 with English translation.

* cited by examiner

Figure 8

| Assembly File | C:\STI_Example\Virtual_3way_Grid\STI_Example.zam |
| Process File | C:\STI_Example\Virtual_3way_Grid\STI_Example.vproc |
| Layout File | C:\STI_Example\Virtual_3way_Grid\STI_Example.vproc |
| Layer Map File | |
| Top Cell | Cell6x6 |
| Output directory | STI_Example_batch |
| Working directory | C:\STI_Example\Virtual_3way_Grid |

| Run | T.19:depth | T.22:depth | z:depth | STP_STIPG_DG1 | THK_STIFIN_STI | STP_STIPG_STI | STP_STIPG_PNS | STP_STIPG_GDD |
|---|---|---|---|---|---|---|---|---|
| 0 (1) | 15.5 | 52.5 | 2 | 24.381696 | 167 | 11.985417 | 10.757186 |
| 1 (2) | 17.75 | 52.5 | 2 | 27.539265 | 164 | 8.658854 | 7.441058 |
| 2 (3) | 20 | 52.5 | 2 | 30.732833 | 160 | 5.37836 | 4.127793 |
| 3 (4) | 22.25 | 52.5 | 2 | 33.890625 | 157 | 2.116406 | 0.866027 |
| 4 (5) | 24.5 | 52.5 | 2 | 37.047595 | 154 | NaN | NaN |
| 5 (6) | 15.5 | 56.25 | 2 | 24.381696 | 167 | 11.871823 | 10.651558 |
| 6 (7) | 17.75 | 56.25 | 2 | 27.539265 | 164 | 8.582142 | 7.317439 |
| 7 (8) | 20 | 56.25 | 2 | 30.732833 | 160 | 5.269715 | 4.032957 |
| 8 (9) | 22.25 | 56.25 | 2 | 33.890625 | 157 | 2.012943 | 0.780521 |
| 9 (10) | 24.5 | 56.25 | 2 | 37.047595 | 153 | NaN | NaN |
| 10 (11) | 15.5 | 60 | 2 | 24.381696 | 167 | 11.795147 | 10.529056 |
| 11 (12) | 17.75 | 60 | 2 | 27.539265 | 163 | 8.481802 | 7.22371 |
| 12 (13) | 20 | 60 | 2 | 30.732833 | 160 | 5.165463 | 3.942212 |
| 13 (14) | 22.25 | 60 | 2 | 33.890625 | 157 | 1.894331 | NaN |
| 14 (15) | 24.5 | 60 | 2 | 37.047595 | 153 | NaN | NaN |
| 15 (16) | 15.5 | 63.75 | 2 | 24.381696 | 167 | 11.693668 | 10.415309 |
| 16 (17) | 17.75 | 63.75 | 2 | 27.539265 | 163 | 8.37849 | 7.159459 |

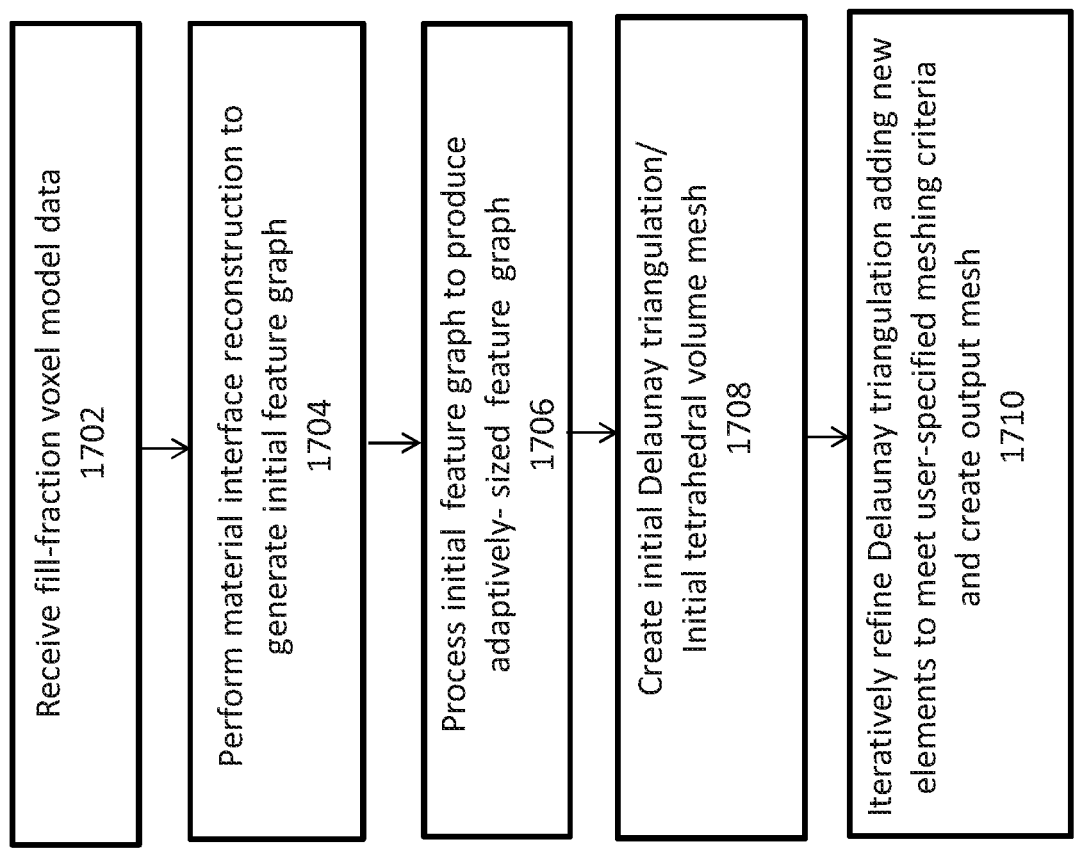

SYSTEM AND METHOD FOR MULTI-MATERIAL MESH GENERATION FROM FILL-FRACTION VOXEL DATA

RELATED APPLICATION

This application is a 35 U.S.C. § 371 national stage filing of International Application No.: PCT/US2019/018237, filed on Feb. 15, 2019, which in turn claims priority to, and the benefit of, United States Provisional Patent Application No. 62/710,335, filed Feb. 16, 2018, the contents of each of which are incorporated herein by reference in their entirety.

BACKGROUND

Semiconductor development organizations at integrated device manufacturers (IDMs) and independent foundries spend significant resources developing the integrated sequence of process operations used to fabricate the chips (integrated circuits (ICs)) they sell from wafers ("wafers" are thin slices of semiconductor material, frequently, but not always, composed of silicon crystal). A large portion of the resources is spent on fabricating experimental wafers and associated measurement, metrology ("metrology" refers to specialized types of measurements conducted in the semiconductor industry) and characterization structures, all for the purpose of ensuring that the integrated process produces the desired semiconductor device structures. These experimental wafers are used in a trial-and-error scheme to develop individual processes for the fabrication of a device structure and also to develop the total, integrated process flow. Due to the increasing complexity of advanced technology node process flows, a large portion of the experimental fabrication runs result in negative or null characterization results. These experimental runs are long in duration, weeks to months in the "fab" (fabrication environment), and expensive, as each experimental wafer may cost $3,000-$10,000. Recent semiconductor technology advances, including FinFET, TriGate, High-K/Metal-Gate, embedded memories and advanced patterning, have dramatically increased the complexity of integrated semiconductor fabrication processes. The cost and duration of technology development using this trial-and-error experimental methodology has concurrently increased.

A virtual fabrication environment for semiconductor device structures offers a platform for performing semiconductor process development at a lower cost and higher speed than is possible with conventional trial-and-error physical experimentation. In contrast to conventional CAD and TCAD environments, a virtual fabrication environment is capable of virtually modeling an integrated process flow and predicting the complete 3D structures of all devices and circuits that comprise a full technology suite. Virtual fabrication can be described in its most simple form as combining a description of an integrated process sequence with a subject design, in the form of 2D design data (masks or layout), and producing a 3D structural model that is predictive of the result expected from a real/physical fabrication run. A 3D structural model includes the geometrically accurate 3D shapes of multiple layers of materials, implants, diffusions, etc. that comprise a chip or a portion of a chip. Virtual fabrication is done in a way that is primarily geometric, however the geometry involved is instructed by the physics of the fabrication processes. By performing the modeling at the structural level of abstraction (rather than physics-based simulations), construction of the structural models can be dramatically accelerated, enabling full technology modeling, at a circuit-level area scale. The use of a virtual fabrication environment thus provides fast verification of process assumptions, and visualization of the complex interrelationship between the integrated process sequence and the 2D design data.

BRIEF SUMMARY

Embodiments of the present invention provide a mesh generation pipeline in a virtual fabrication environment that robustly generates high-quality triangle surface and tetrahedral volume meshes from multi-material fill-fraction voxel data. Multi-material topology is accurately captured while preserving characteristic feature edges of the model. The mesh generation technique described herein is robust to noise in input data and is scalable to large and complex voxel models as required for modeling modern three-dimensional semiconductor devices.

In one embodiment, a non-transitory medium holds computer-executable instructions for performing multi-material mesh generation in a virtual fabrication environment. The instructions when executed cause at least one computing device to receive, in the virtual fabrication environment, fill-fraction voxel model data of a semiconductor device as an input domain. The instructions when executed also cause the at least one computing device to create, in the virtual fabrication environment, a feature graph using the fill-fraction voxel model data. The instructions when executed also cause the at least one computing device to generate, in the virtual fabrication environment, a multi-material mesh for the semiconductor device, the generating of the multi-material mesh performing a Delaunay triangulation using the feature graph and material identifiers from the fill-fraction voxel model data.

In another embodiment, a system for performing multi-material mesh generation in a virtual fabrication environment includes at least one simulation application executable by a computing device and at least one computing device equipped with a processor and configured to generate a virtual fabrication environment for semiconductor device structures. The virtual fabrication environment is configured to receive fill-fraction voxel model data of a semiconductor device as an input domain and receive user-defined meshing criteria for a Delaunay triangulation. The virtual fabrication environment is further configured to create a feature graph using the fill-fraction voxel model data and perform the Delaunay triangulation iteratively using the feature graph and material identifiers from the fill-fraction voxel model data until the user-defined meshing criteria are satisfied to generate and optimize the multi-material mesh for the semiconductor device. The simulation application is configured to accept the generated multi-material mesh as an input.

BRIEF DESCRIPTION OF THE DRAWINGS

The accompanying drawings, which are incorporated in and constitute a part of this specification, illustrate one or more embodiments of the invention and, together with the description, help to explain the invention. In the drawings:

FIG. 8 depicts an exemplary tabular-formatted display of virtual metrology data generated in a virtual experiment provided by the virtual fabrication environment;

FIG. 17 depicts another exemplary sequence of steps performed to generate a multi-material mesh in an exemplary embodiment.

DETAILED DESCRIPTION

Mesh generation from domains composed of multiple materials has recently gained increased attention in diverse areas such as medical imaging, material science, 3D printing, and virtual fabrication. The goal of multi-material meshing is to generate surface and volume meshes subdividing the domain into discrete geometric entities such as triangles and tetrahedra. The meshes typically need to be conformal on the boundary, i.e., elements belonging to different materials need to uniquely match up at their interface with another material. Depending on the concrete application domain the resulting meshes should exhibit certain characteristics such as bounds on mesh element quality or feature preservation. Similarly, the meshing process itself should adhere to functional usage requirements such as scalability to large models, robustness, or computational performance.

Embodiments of the present invention provide a mesh generation pipeline that robustly generates high-quality triangle surface and tetrahedral volume meshes from multi-material fill-fraction voxel data. However, prior to discussing the mesh generation pipeline in greater detail, an exemplary 3D virtual fabrication environment which may be utilized to practice embodiments is first described.

Exemplary Virtual Fabrication Environment

Figure 1:
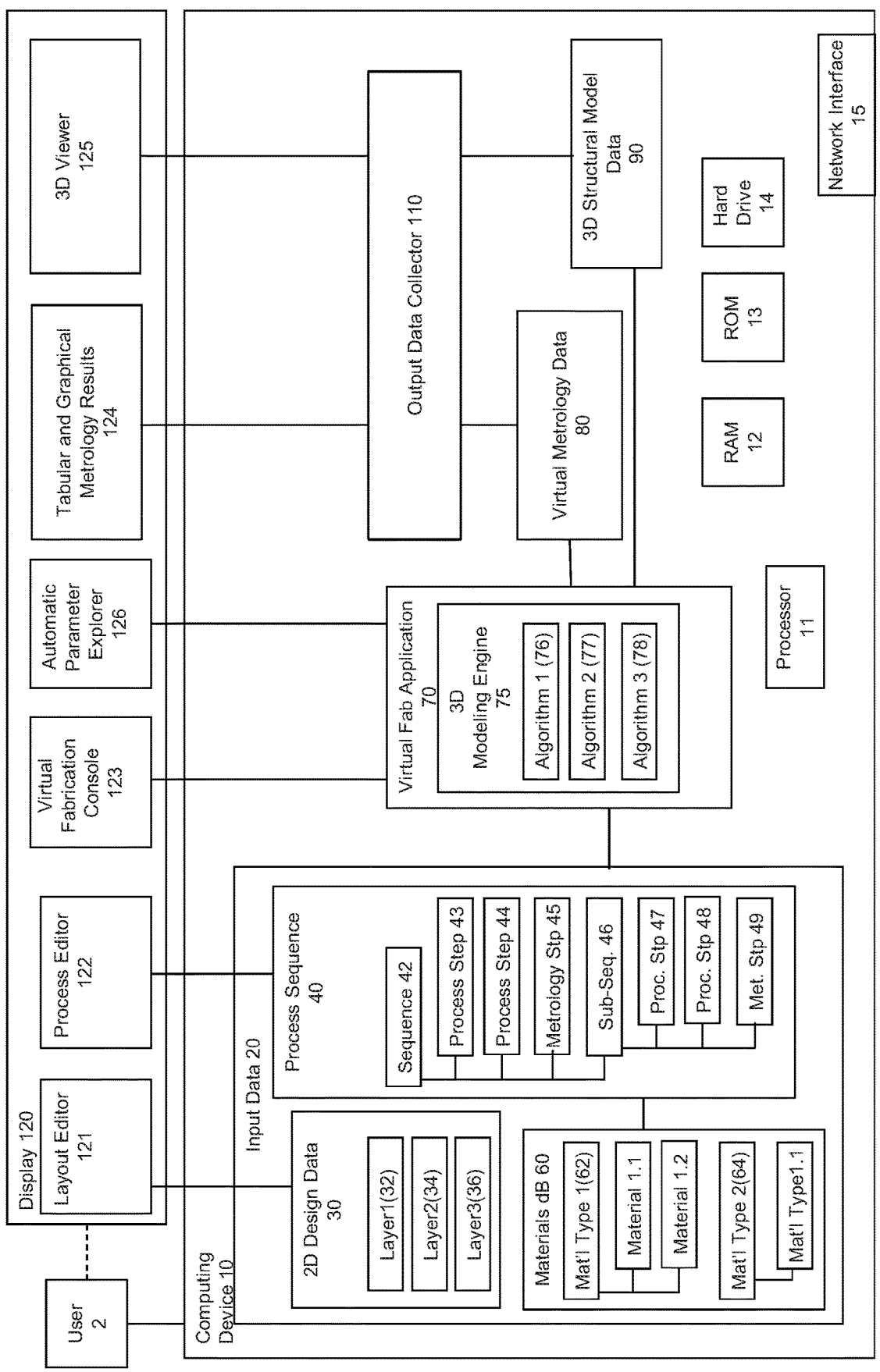
FIG. 1 depicts an exemplary virtual fabrication environment suitable for practicing an embodiment of the present invention.

FIG. 1 depicts an exemplary virtual fabrication environment 1 suitable for practicing an embodiment of the present invention. Virtual fabrication environment 1 includes a computing device 10 accessed by a user 2. Computing device 10 is in communication with a display 120. Display 120 may be a display screen that is part of computing device 10 or may be a separate display device or display surface in communication with computing device 10. Computing device 10 may be a PC, laptop computer, tablet computing device, server, or some other type of computing device equipped with a processor 11 and able to support the operations of 3D modeling engine 75 (described further below). The processor may have one or more cores. The computing device 10 may also include volatile and non-volatile storage such as, but not limited to, Random Access Memory (RAM) 12, Read Only Memory (ROM) 13 and hard drive 14. Computing device 10 may also be equipped with a network interface 15 so as to enable communication with other computing devices.

Computing device 10 may store and execute virtual fabrication application 70 including 3D modeling engine 75. 3D modeling engine 75 may include one or more algorithms such as algorithm 1 (76), algorithm 2 (77), and algorithm 3 (78) used in virtually fabricating semiconductor device structures. 3D modeling engine 75 may accept input data 20 in order to perform virtual fabrication "runs" that produce semiconductor device structural model data 90. Virtual fabrication application 70 and 3D modeling engine 75 may generate a number of user interfaces and views used to create and display the results of virtual fabrication runs. For example, virtual fabrication application 70 and 3D modeling engine 75 may display layout editor 121, process editor 122 and virtual fabrication console 123 used to create virtual fabrication runs. Virtual fabrication application 70 and 3D modeling engine 75 may also display a tabular and graphical metrology results view 124 and 3D view 125 for respectively displaying results of virtual fabrication runs and 3D structural models generated by the 3D modeling engine 75 during virtual fabrication of semiconductor device structures.

Input data 20 includes both 2D design data 30 and process sequence 40. Process sequence 40 may be composed of multiple process steps 43, 44, 47, 48 and 49. As described further herein, process sequence 40 may also include one or more virtual metrology measurement process steps 45. Process sequence 40 may further include one or more subsequences which include one or more of the process steps or virtual metrology measurement process steps. 2D design data 30 includes of one or more layers such as layer 1 (32), layer 2 (34) and layer 3 (36), typically provided in an industry-standard layout format such as GDS II (Graphical Design System version 2) or OASIS (Open Artwork System Interchange Standard).

Input data 20 may also include a materials database 60 including records of material types such as material type 1 (62) and material type 2 (64) and specific materials for each material type. Many of the process steps in a process sequence may refer to one or more materials in the materials database. Each material has a name and some attributes such as a rendering color. The materials database may be stored in a separate data structure. The materials database may have hierarchy, where materials may be grouped by types and sub-types. Individual steps in the process sequence may refer to an individual material or a parent material type. The hierarchy in the materials database enables a process sequence referencing the materials database to be modified more easily. For example, in virtual fabrication of a semiconductor device structure, multiple types of oxide material may be added to the structural model during the course of a process sequence. After a particular oxide is added, subsequent steps may alter that material. If there is no hierarchy in the materials database and a step that adds a new type of oxide material is inserted in an existing process sequence, all subsequent steps that may affect oxide materials must also be modified to include the new type of oxide material. With a materials database that supports hierarchy, steps that operate on a certain class of materials such as oxides may refer only to the parent type rather than a list of materials of the same type. Then, if a step that adds a new type of oxide material is inserted in a process sequence, there is no need to modify subsequent steps that refer only to the oxide parent type. Thus hierarchical materials make the process sequence more resilient to modifications. A further benefit of hierarchical materials is that stock process steps and sequences that refer only to parent material types can be created and re-used.

3D Modeling Engine 75 uses input data 20 to perform the sequence of operations/steps specified by process sequence 40. As explained further below, process sequence 40 may include one or more virtual metrology steps 45, 49 that indicate a point in the process sequence during a virtual fabrication run at which a measurement of a structural component should be taken. The measurement may be taken using a locator shape previously added to a layer in the 2D design data 30. In an alternative embodiment the measurement location may be specified by alternate means such as (x, y) coordinates in the 2D design data or some other means of specifying a location in the 2D design data 30 instead of through the use of a locator shape. The performance of the process sequence 40 during a virtual fabrication run generates virtual metrology data 80 and 3D structural model data 90. 3D structural model data 90 may be used to generate a 3D view of the structural model of the semiconductor device structure which may be displayed in the 3D viewer 125. Virtual metrology data 80 may be processed and presented to a user 2 in the tabular and graphical metrology results view 124.

Figure 2:
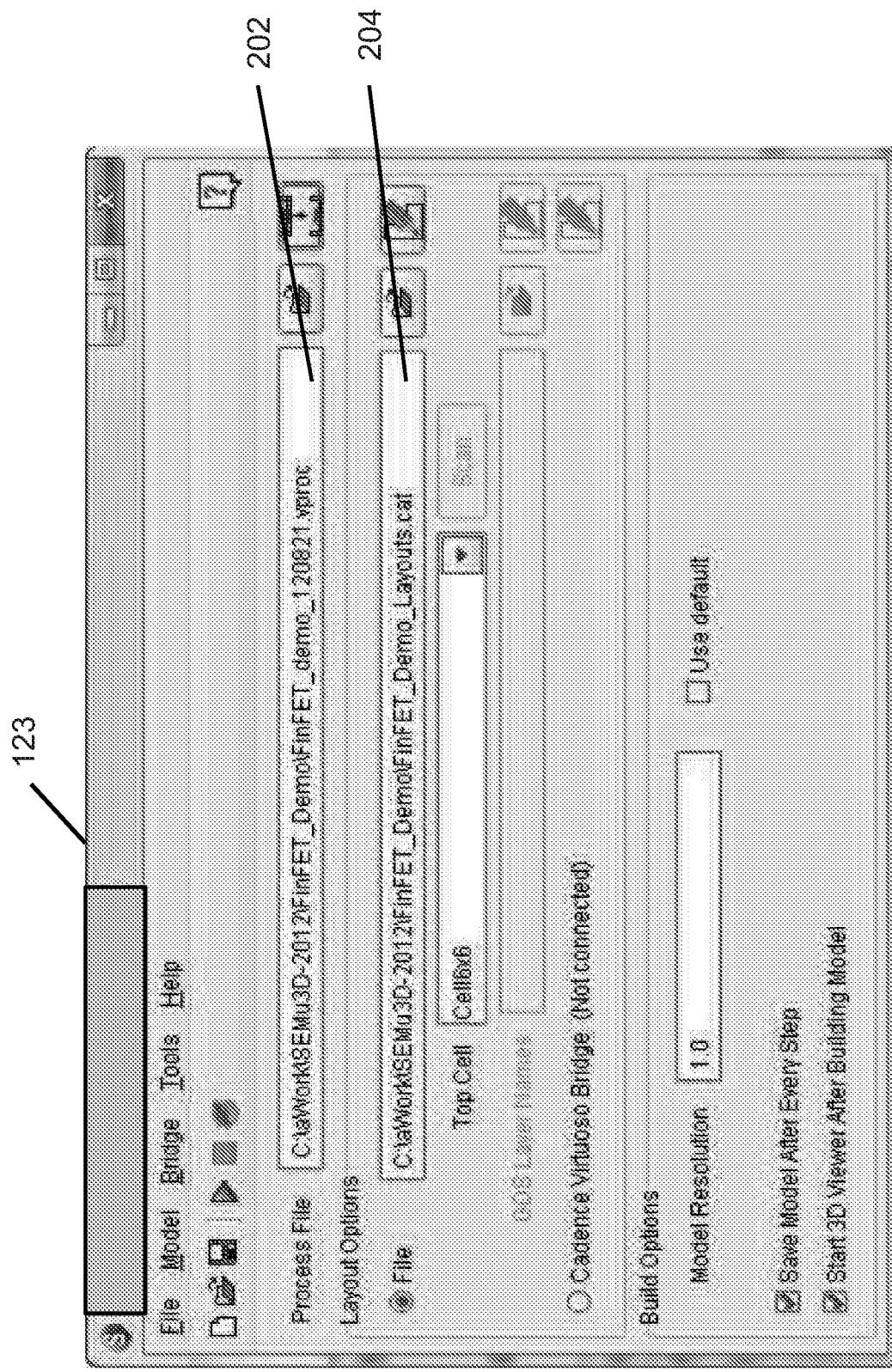
FIG. 2 depicts an exemplary virtual fabrication console provided by the virtual fabrication environment.

FIG. 2 depicts an exemplary virtual fabrication console 123 provided by the virtual fabrication environment to set up a virtual fabrication run. The virtual fabrication console 123 allows the user to specify a process sequence 202 and the layout (2D design data) 204 for the semiconductor device structure that is being virtually fabricated. It should be appreciated however that the virtual fabrication console can also be a text-based scripting console that provides the user with a means of entering scripting commands that specify the required input and initiate building of a structural model, or building a set of structural models corresponding to a range of parameter values for specific steps in the process sequence. The latter case is considered a virtual experiment (discussed further below).

Figure 3:
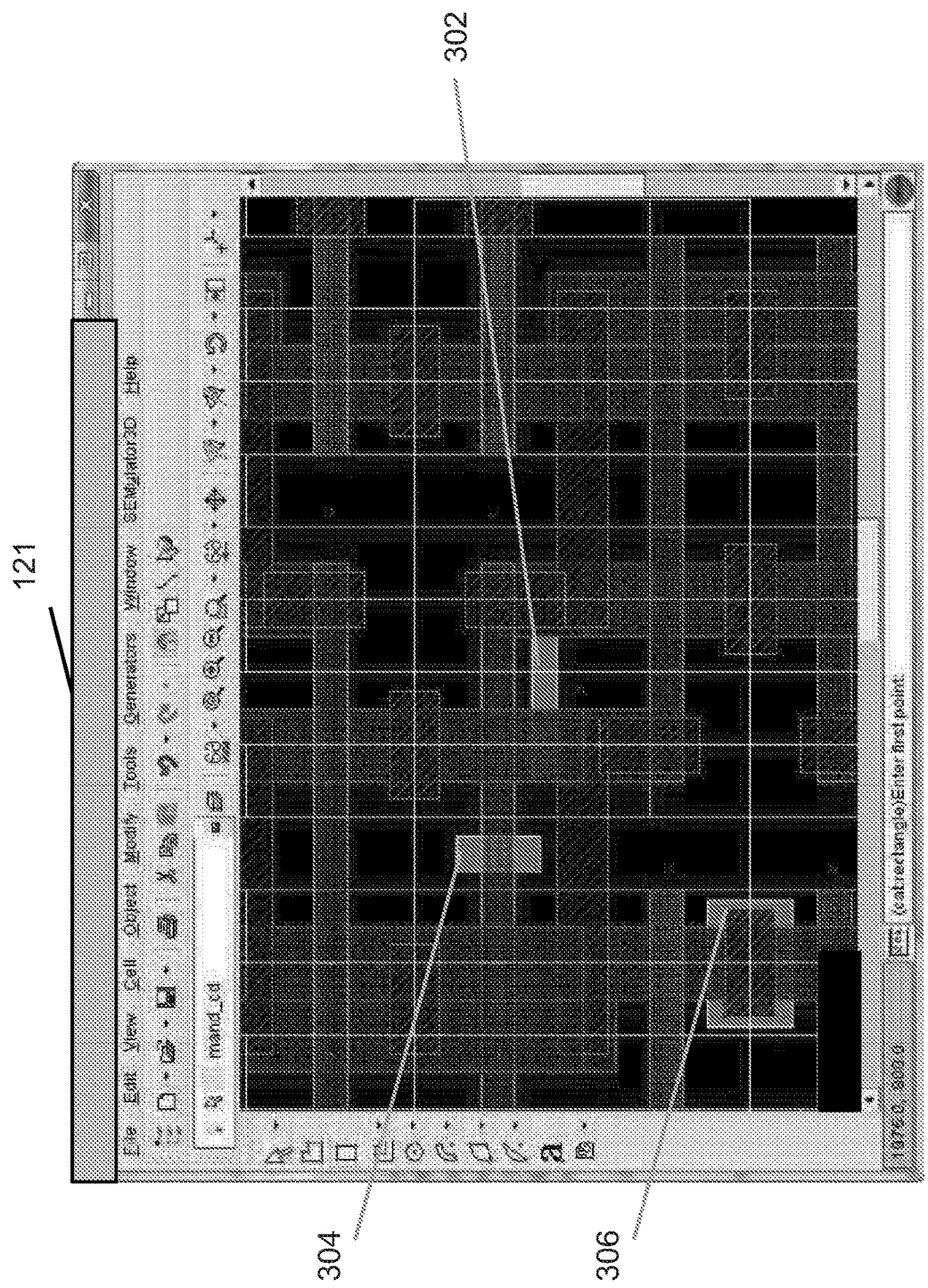
FIG. 3 depicts an exemplary layout editor provided by the virtual fabrication environment.

FIG. 3 depicts an exemplary layout editor provided by the virtual fabrication environment. The layout editor 121 displays the 2D design layout specified by the user in the virtual fabrication console 123. In the layout editor, color may be used to depict different layers in the design data. The areas enclosed by shapes or polygons on each layer represent regions where a photoresist coating on a wafer may be either exposed to light or protected from light during a photolithography step in the integrated process flow. The shapes on one or more layers may be combined (booleaned) to form a mask that is used in a photolithography step. The layout editor 121 provides a means of inserting, deleting and modifying a polygon on any layer, and of inserting, deleting or modifying layers within the 2D design data. A layer can be inserted for the sole purpose of containing shapes or polygons that indicate the locations of virtual metrology measurements. The rectangular shapes 302, 304, 306 have been added to an inserted layer (indicated by a different color) and mark the locations of virtual metrology measurements. As noted above, other approaches to specifying the locations for the virtual metrology measurements besides the use of locator shapes should also be considered within the scope of the present invention. The design data is used in combination with the process data and materials database to build a 3D structural model.

Figure 4:
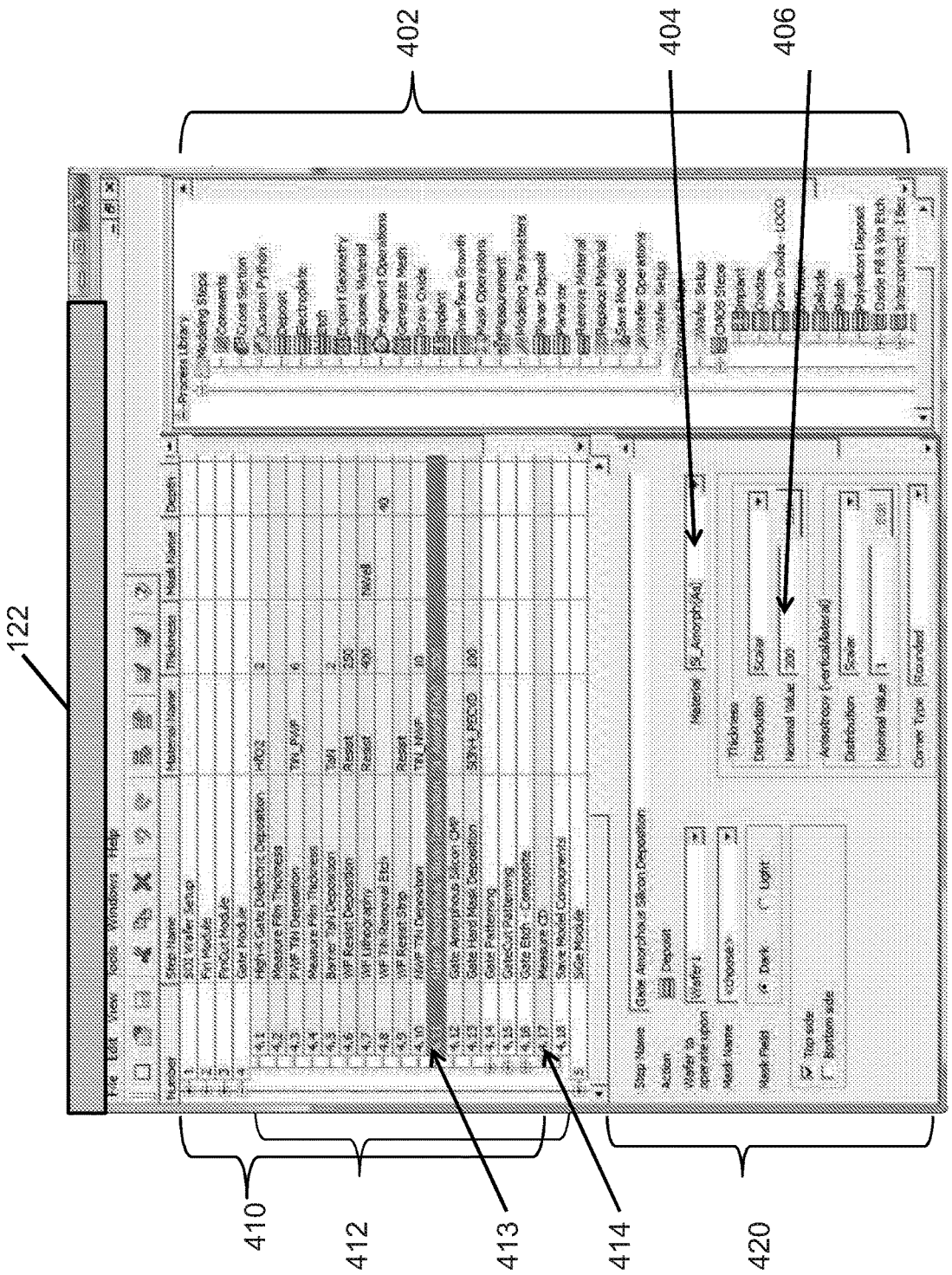
FIG. 4 depicts an exemplary process editor provided by the virtual fabrication environment.

Inserted layers in the design data displayed in the layout editor 121 may include inserted locator shapes. For example, a locator shape may be a rectangle, the longer sides of which indicate the direction of the measurement in the 3D structural model. For example, in FIG. 3, a first locator shape 302 may mark a double patterning mandrel for virtual metrology measurement, a second locator shape 304 may mark a gate stack for virtual metrology measurement and a third locator shape 306 may mark a transistor source or drain contact for virtual metrology measurement FIG. 4 depicts an exemplary process editor 122 provided by the virtual fabrication environment. The user defines a process sequence in the process editor. The process sequence is an ordered list of process steps conducted in order to virtually fabricate the user's selected structure. The process editor may be a text editor, such that each line or group of lines corresponds to a process step, or a specialized graphical user interface such as is depicted in FIG. 4. The process sequence may be hierarchical, meaning process steps may be grouped into sub-sequences and sub-sequences of sub-sequences, etc. Generally, each step in the process sequence corresponds to an actual step in the fab. For instance, a sub-sequence for a reactive ion etch operation might include the steps of spinning on photo resist, patterning the resist, and performing the etch operation. The user specifies parameters for each step or sub-step that are appropriate to the operation type. Some of the parameters are references to materials in the materials database and layers in the 2D design data. For example, the parameters for a deposit operation primitive are the material being deposited, the nominal thickness of the deposit and the anisotropy or ratio of growth in the lateral direction versus the vertical direction. This deposit operation primitive can be used to model actual processes such as chemical vapor deposition (CVD). Similarly, the parameters for an etch operation primitive are a mask name (from the design data), a list of materials affected by the operation, and the anisotropy.

There may be hundreds of steps in the process sequence and the process sequence may include sub-sequences. For example, as depicted in FIG. 4, a process sequence 410 may include a subsequence 412 made up of multiple process steps such as selected step 413. The process steps may be selected from a library of available process steps 402. For the selected step 413, the process editor 122 enables a user to specify all required parameters 420. For example, a user may be able to select a material from a list of materials in the material database 404 and specify a process parameter 406 for the material's use in the process step 413.

One or more steps in the process sequence may be virtual metrology steps inserted by a user. For example, the insertion of step 4.17 "Measure CD" (414), where CD denotes a critical dimension, in process sequence 412 would cause a virtual metrology measurement to be taken at that point in the virtual fabrication run using one or more locator shapes that had been previously inserted on one or more layers in the 2D design data. By inserting the virtual metrology steps directly in the fabrication sequence, the embodiment of the present invention allows virtual metrology measurements to be taken at critical points of interest during the fabrication process. As the many steps in the virtual fabrication interact in the creation of the final structure, the ability to determine geometric properties of a structure, such as cross-section dimensions and surface area, at different points in the integrated process flow is of great interest to the process developer and structure designer.

Figure 5:
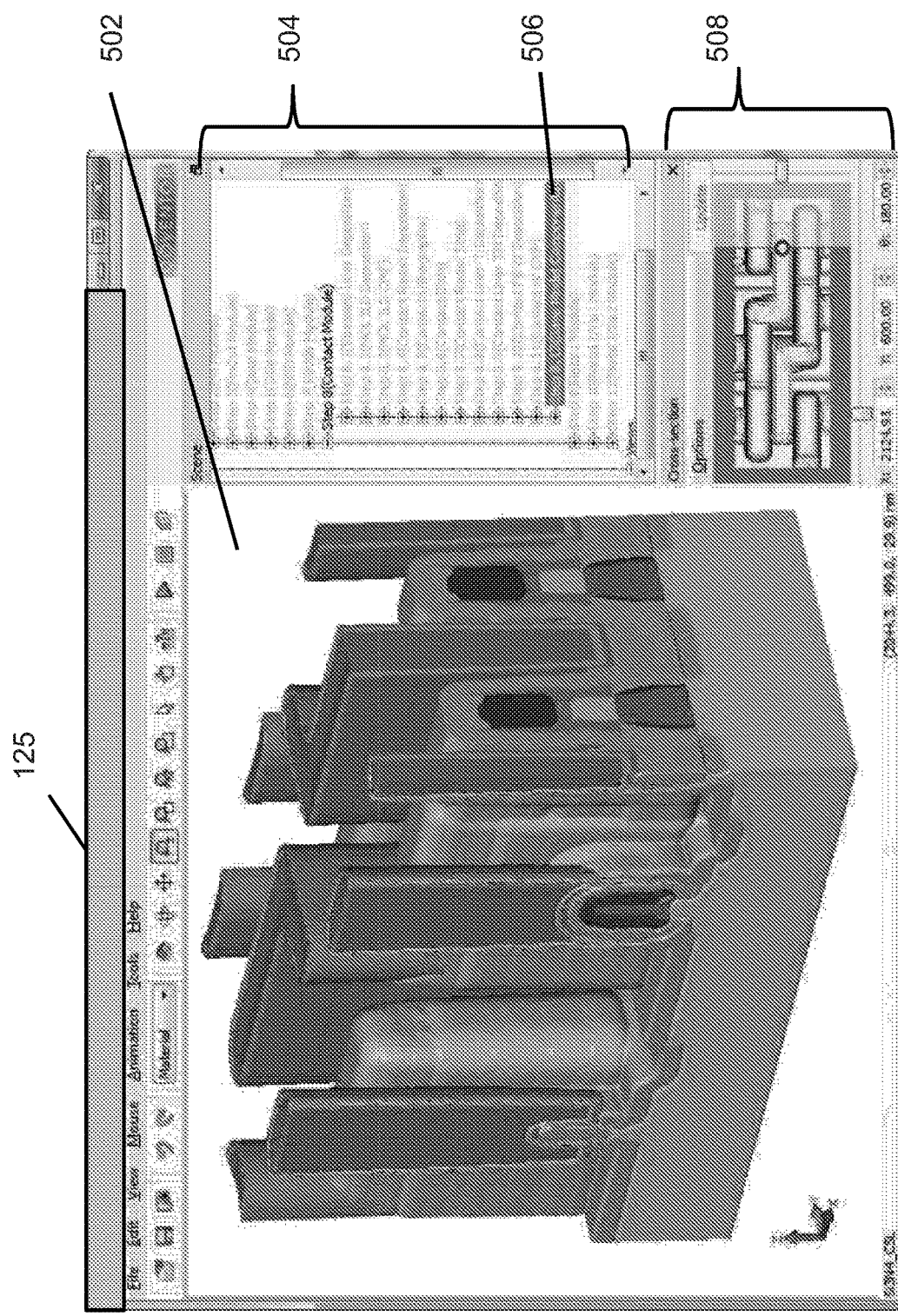
FIG. 5 depicts an exemplary 3D viewer provided by the virtual fabrication environment.

FIG. 5 depicts an exemplary 3D viewer 125 provided by the virtual fabrication environment. The 3D viewer 75 may include a 3D view canvas 502 for displaying 3D models generated by the 3D modeling engine 75. The 3D viewer 75 may display saved states 504 in the process sequence and allow a particular state to be selected 506 and appear in the 3D view canvas. The 3D Viewer provides functionality such as zoom in/out, rotation, translation, cross section, etc. Optionally, the user may activate a cross section view in the 3D view canvas 502 and manipulate the location of the cross section using a miniature top view 508.

While building a single structural model can be valuable, there is increased value in virtual fabrication that builds a large number of models. The virtual fabrication environment enables a user to create and run a virtual experiment. In a virtual experiment of the present invention, a range of values of process parameters can be explored. A virtual experiment may be set up by specifying a set of parameter values to be applied to individual processes (rather than a single value per parameter) in the full process sequence. A single process sequence or multiple process sequences can be specified this way. The 3D modeling engine 75, executing in virtual experiment mode, then builds multiple models spanning the process parameter set, all the while utilizing the virtual metrology measurement operations described above to extract metrology measurement data for each variation. This capability provided by the embodiments of the present invention may be used to mimic two fundamental types of experiments that are typically performed in the physical fab environment. Firstly, fabrication processes vary naturally in a stochastic (non-deterministic) fashion. As explained herein, embodiments of the present invention use a fundamentally deterministic approach for each virtual fabrication run that nevertheless can predict non-deterministic results by conducting multiple runs. The virtual experiment mode provided by an embodiment of the present invention allows the virtual fabrication environment to model through the entire statistical range of variation for each process parameter, and the combination of variations in many/all process parameters. Secondly, experiments run in the physical fab may specify a set of parameters to be intentionally varied when fabricating different wafers. The virtual experiment mode of the present invention enables the Virtual Fabrication Environment to mimic this type of experiment as well, by performing multiple virtual fabrication runs on the specific variations of a parameter set.

Each process in the fabrication sequence has its own inherent variation. To understand the effect of all the aggregated process variations in a complex flow is quite difficult, especially when factoring in the statistical probabilities of the combinations of variations. Once a virtual experiment is created, the process sequence is essentially described by the combination of numerical process parameters included in the process description. Each of these parameters can be characterized by its total variation (in terms of standard deviation or sigma values), and therefore by multiple points on a Gaussian distribution or other appropriate probability distribution. If the virtual experiment is designed and executed to examine all of the combinations of the process variations (multiple points on each Gaussian, for example the ±3 sigma, ±2 sigma, ±1 sigma, and nominal values of each parameter), then the resulting graphical and numerical outputs from virtual metrology steps in the sequence cover the total variation space of the technology. Even though each case in this experimental study is modeled deterministically by the virtual fabrication system, the aggregation of the virtual metrology results contains a statistical distribution. Simple statistical analysis, such as Root Sum Squares (RSS) calculation of the statistically uncorrelated parameters, can be used to attribute a total variation metric to each case of the experiment. Then, all of the virtual metrology output, both numerical and graphical, can be analyzed relative to the total variation metric.

In typical trial-and-error experimental practice in a physical fab, a structural measurement resulting from the nominal process is targeted, and process variations are accounted for by specifying an overly large (conservative) margin for the total variation in the structural measurement (total structural margin) which must be anticipated in subsequent processes. In contrast, the virtual experiment embodiments of the present invention can provide quantitative predictions of the total variation envelope for a structural measurement at any point in the integrated process flow. The total variation envelope, rather than the nominal value, of the structural measurement may then become the development target. This approach can ensure acceptable total structural margin throughout the integrated process flow, without sacrificing critical structural design goals. This approach, of targeting total variation may result in a nominal intermediate or final structure that is less optimal (or less aesthetically pleasing) than the nominal structure that would have been produced by targeting the nominal process. However, this sub-optimal nominal process is not critical, since the envelope of total process variation has been accounted for and is more important in determining the robustness and yield of the integrated process flow. This approach is a paradigm shift in semiconductor technology development, from an emphasis on the nominal process to an emphasis on the envelope of total process variation.

Figure 6:
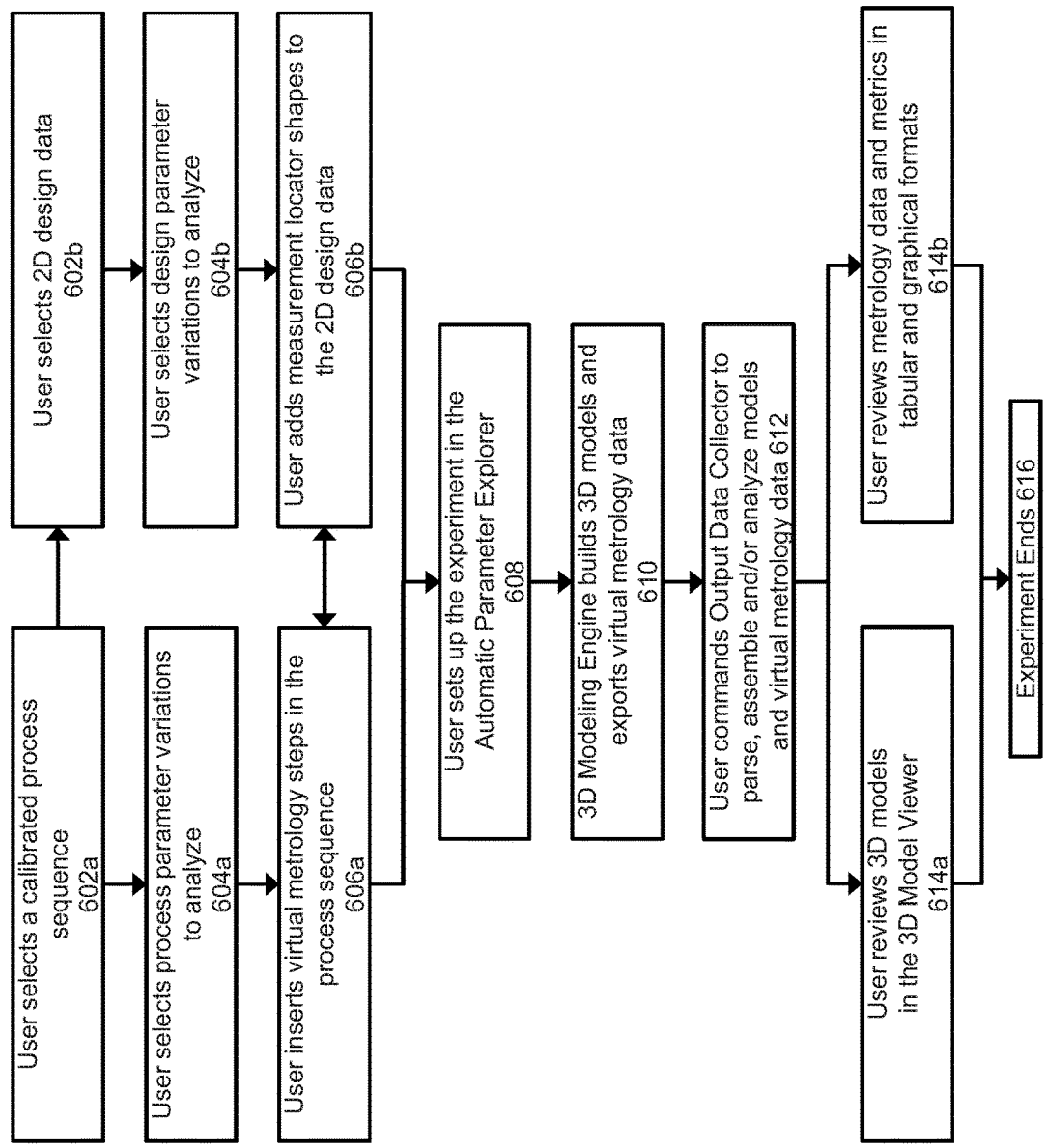
FIG. 6 depicts an exemplary sequence of steps performed in the virtual fabrication environment to set up and perform a virtual experiment generating virtual metrology measurement data for multiple semiconductor device structure models.
Figure 7:
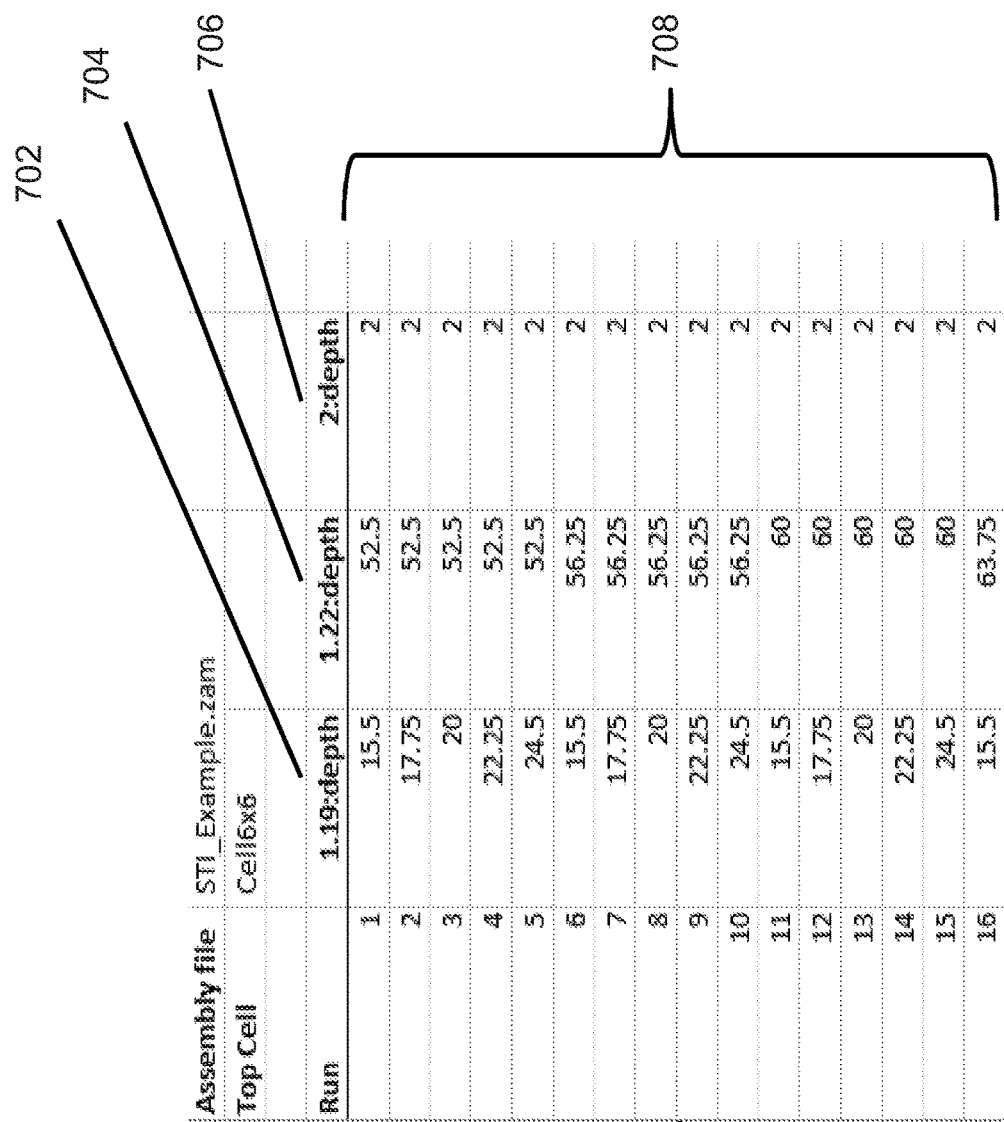
FIG. 7 depicts an exemplary parameter explorer view used to provide process parameters for a virtual experiment provided by the virtual fabrication environment.

FIG. 6 depicts an exemplary sequence of steps that may be performed in the virtual fabrication environment to set up and perform a virtual experiment generating virtual metrology measurement data for multiple semiconductor device structural models. The sequence begins with a user selecting a process sequence (which may have been previously calibrated to make the results more structurally predictive (step 602*a*) and identifying/creating 2D design data (step 602*b*). The user may select process parameter variations to analyze (step 604*a*) and/or design parameter variations to analyze (step 604*b*). The user inserts one or more virtual metrology steps in the process sequence as set forth above (step 606*a*) and adds measurement locator shapes to the 2D design data (step 606*b*). The user may set up the virtual experiment with the aid of a specialized user interface, an automatic parameter explorer 126 (step 608). An exemplary automatic parameter explorer is depicted in FIG. 7 and may display, and allow the user to vary, the process parameters to be varied 702, 704, 706 and the list of 3D models to be built with their corresponding different parameter values 708. The parameter ranges for a virtual experiment can be specified in a tabular format. The 3D modeling engine 75 builds the 3D models and exports the virtual metrology measurement data for review (step 610). The virtual experiment mode provides output data handling from all Virtual Measurement/Metrology operations. The output data from the virtual metrology measurements may be parsed and assembled into a useful form (step 612).

With this parsing and assembling, subsequent quantitative and statistical analysis can be conducted. A separate output data collector module 110 may be used to collect 3D model data and virtual metrology measurement results from the sequence of virtual fabrication runs that comprise the virtual experiment and present them in graphical and tabular formats. FIG. 8 depicts an exemplary tabular-formatted display of virtual metrology data generated by a virtual experiment. In the tabular formatted display, the virtual metrology data collected during the virtual experiment 802 and the list of virtual fabrication runs 804 may be displayed.

Figure 9:
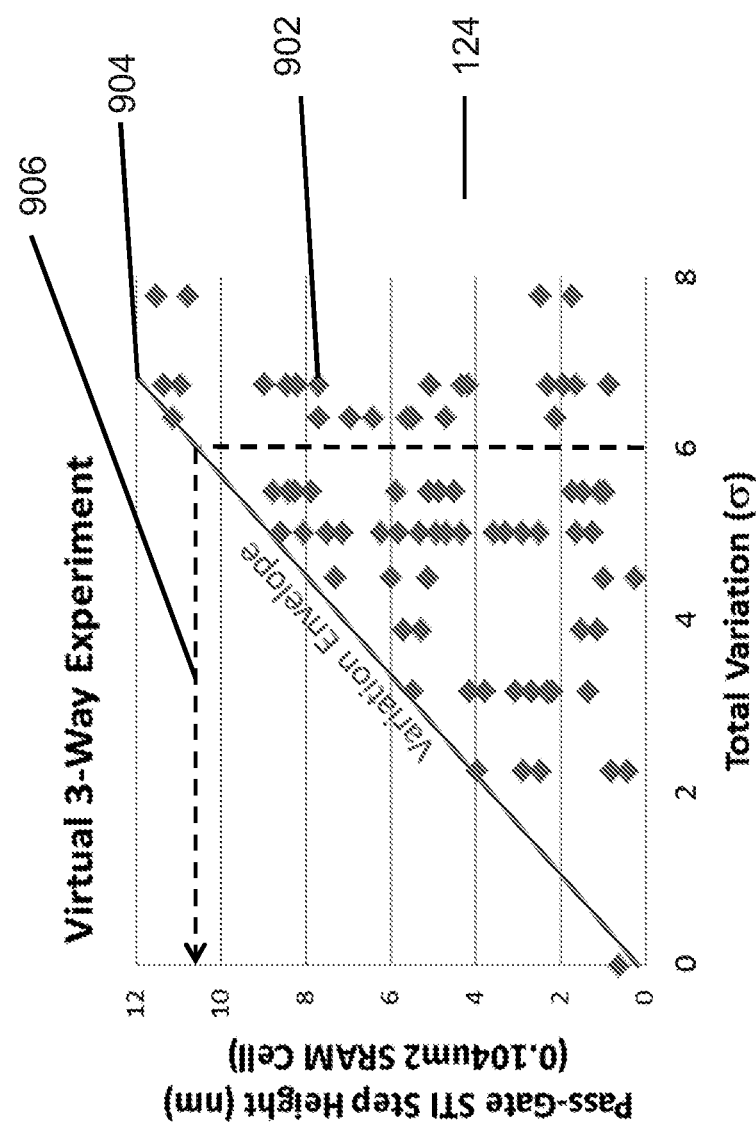
FIG. 9 depicts an exemplary graphical display of virtual metrology data generated in a virtual experiment provided by the virtual fabrication environment.

FIG. 9 depicts an exemplary 2D X-Y graphical plot display of virtual metrology data generated by a virtual experiment. In the example depicted in FIG. 7, the total variation in shallow trench isolation (STI) step height due to varying 3 parameters in preceding steps of the process sequence is shown. Each diamond 902 represents a virtual fabrication run. The variation envelope 904 is also displayed as is the depicted conclusion 906 that the downstream process modules must support approximately 10.5 nm of total variation in STI step height to achieve robustness through 6 sigma of incoming variation. The virtual experiment results can also be displayed in multi-dimensional graphic formats.

Once the results of the virtual experiment have been assembled, the user can review 3D models that have been generated in the 3D viewer (step 614*a*) and review the virtual metrology measurement data and metrics presented for each virtual fabrication run (step 614*b*). Depending on the purpose of the virtual experiment, the user can analyze the output from the 3D modeling engine for purposes of developing a process sequence that achieves a desired nominal structural model, for further calibrating process step input parameters, or for optimizing a process sequence to achieve a desired process window.

The 3D modeling engine's 75 task of constructing multiple structural models for a range of parameter values (comprising a virtual experiment) is very compute intensive and therefore could require a very long time (many days or weeks) if performed on a single computing device. To provide the intended value of virtual fabrication, model building for a virtual experiment must occur many times faster than a physical experiment. Achieving this goal with present day computers requires exploiting any and all opportunities for parallelism. The 3D modeling engine 75 of the present invention uses multiple cores and/or processors to perform individual modeling steps. In addition, the structural models for different parameter values in a set are completely independent and can therefore be built in parallel using multiple cores, multiple processors, or multiple systems.

3D modeling engine 75 may represent the underlying structural model using a voxel-based implicit geometry representation. Voxels are essentially 3D pixels. Each voxel is a cube of the same size, and may contain one or more materials, or no materials. An implicit geometry representation is one in which the interface between materials in the 3D structural model are defined without an explicit representation of the (x,y,z) coordinate locations of that interface. Many of the operations performed by the 3D modeling engine are voxel modeling operations. Modeling operations based on a digital voxel representation are far more robust than the corresponding operations in a conventional analog solid modeling kernel (e.g. a NURBS-based solid modeling kernel). Such solid modeling kernels generally rely on a large number of heuristic rules to deal with various geometric situations, and modeling operations may fail when the heuristic rules do not properly anticipate a situation. Aspects of semiconductor structural modeling that cause problems for NURBS-based solid modeling kernels include the very thin layers produced by deposition processes and propagation of etch fronts that results in merging faces and/or fragmentation of geometry.

Some simulation tools require a volume mesh to be generated from some form of explicit boundary representation and previous solutions exist for creating a volume mesh of B-rep geometry or from surface meshes. Such volume meshes for finite-element or finite-volume simulation techniques will preserve the location of the interface between materials to a high level of accuracy. Such a volume mesh is called a boundary-conforming mesh or simply a conformal mesh. A key feature of such a mesh is that no element crosses the boundary between materials. In other words, for a volume mesh of tetrahedral elements, then each element is wholly within one material and thus no tetrahedron contains more than one material. However, neither B-rep and similar solid modeling kernels, nor surface mesh representations are optimal for virtual fabrication. Solid modeling kernels generally rely on a large number of heuristic rules to deal with various geometric situations, and modeling operations may fail when the heuristic rules do not properly anticipate a situation. Geometry representations that instead represent the boundaries implicitly do not suffer from these problems. A virtual fabrication system that uses an implicit representation exclusively thus has significant advantages, even if it may not represent the interfaces as accurately.

Figure 10A:
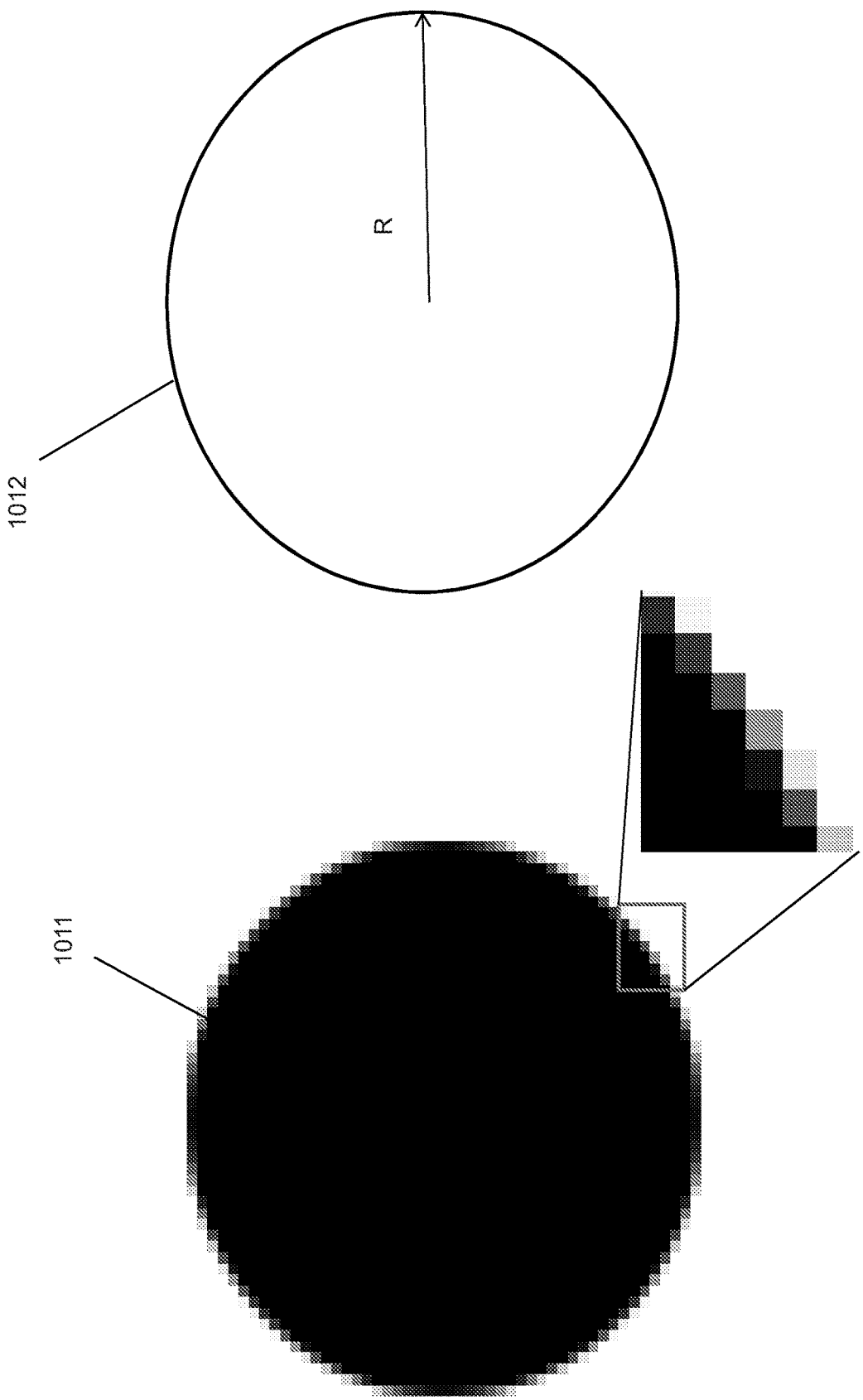
FIG. 10A depicts exemplary representations of a circle boundary.

Geometric data represented with voxels implicitly represents the interface between materials. FIG. 10A illustrates this concept in two dimensions for a circle. A B-rep representation 1012 may represent the circle as the equation of a circle with radius R with material 1 inside the circle with material 2 outside. In contrast, a voxel representation of the circle 1011 is an array of cubes where each cube stores the material identification numbers within it, and the relative amounts of each material. The grayscale darkness of the squares in 1011 indicates the relative percentage of material 1 versus material 2. Black indicates 100% material 1 and 0% material 2, and white indicates 0% material 1 and 100% material 2. Since the circle cuts through the voxels along its path, grayscale voxels on the boundary of the circle are partially filled with each material and the darkness of gray indicates the fill fraction. Partially filled voxels indicate that the boundary crosses through that voxel, but does not indicate where and with what orientation. The fill fractions of a boundary voxel and others in its neighborhood may be used to determine the boundary explicitly.

Figure 10B:
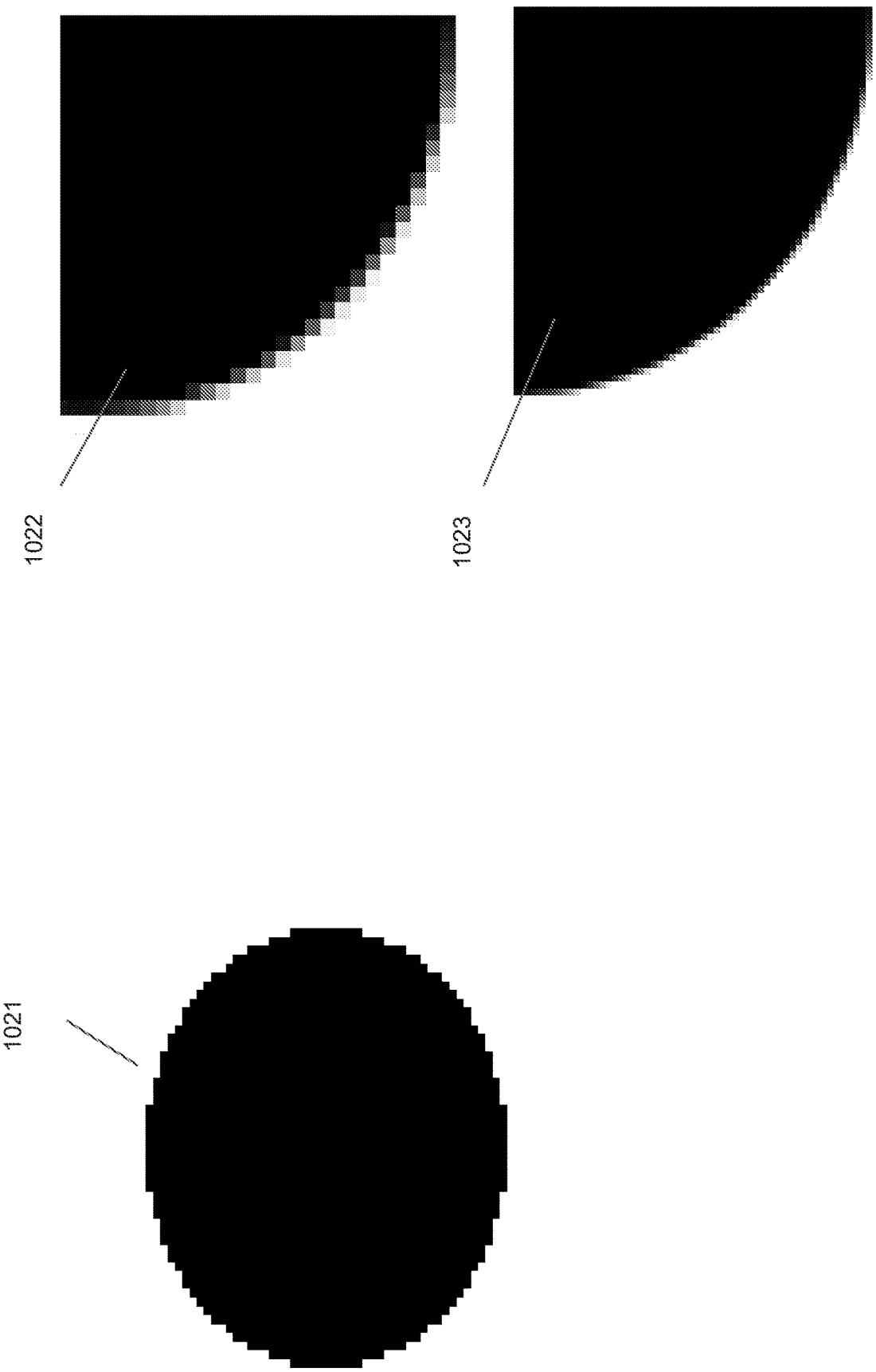
FIG. 10B depicts exemplary staircasing effects.

Material properties at a location within the geometry are approximated using the properties of the majority material within each voxel. For instance, in an operation to determine electrical resistance if a boundary voxel is more than 50% of material 2 in circle 1011, then the bulk resistivity of material 2 is used for all values of x within that voxel, and similarly voxels of 50% or more of material 1 use bulk resistivity of material 1. This is equivalent to filling those voxels full of the majority material as shown in FIG. 10B, circle 1021. This approach incurs what is called 'staircasing' error in the solution over methods that explicitly know the boundary location, and thus know precisely the material at each location, x. One method to compensate for staircasing error is to decrease the size of each voxel when performing the virtual fabrication of the 3D model and thus reduce the volume of boundary voxels. For instance, circle portion 1022 is part of the circle of the voxel representation in 1011, and circle portion 1023 is the same part of the circle built with voxels one half of the size in each dimension. The volume taken up by boundary voxels is much less with the smaller voxel size and thus the error would be less. It should be noted however that decreasing the voxel size greatly increases both the virtual fabrication computation time as well as the simulation time which may lead to unacceptable results in some circumstances.

Mesh Generation Pipeline

Current grid-based methods of multi-material mesh generation are typically highly efficient in terms of computational performance but fall short in a number of areas including one or more of robustness, feature preservation, or scalability. Grid-based methods create some form of background grid covering the input domain and then create the mesh based on these background grid cells, e.g., by subdividing the cells containing the domain boundary (e.g. by utilizing the well-known "marching cubes" algorithm) or by snapping cell points to the boundary. These approaches are often highly efficient since a large part of the information required by the algorithms can be effectively pre-computed and re-used through efficient look-ups and caching. However, often the quality of the resulting meshes is not satisfactory: The meshes may contain badly shaped elements, and, depending on the particular method, different types of artifacts such as, but not limited to, intersecting triangles, fold-overs (degenerate dihedral angles between triangles), or non-manifold configurations (singular vertices, non-manifold edges). Furthermore, sharp features are often not well-represented and chamfered. In the case of multi-material meshing, the robustness guarantees are not on the same level as in the single surface case (i.e., often the proofs and guarantees are not as solid). Grid-based methods therefore heavily depend on the chosen grid resolution and offer only a limited amount of adaptivity.

For example, the dual contouring method is a prominent grid-based multi-material meshing approach. However, the resulting meshes produced from dual contouring often contain the above mentioned artifacts such as intersections, fold-overs, or non-manifold configurations. While several attempts have been made to improve the results, the resulting meshes can still contain degenerate elements. Degenerate elements are completely flat and have no volume. Extensions of the marching cubes algorithm to multiple materials suffer from similar limitations. In addition, the number of materials supported can be limited or the increased size of the look-up tables tempers performance as the number of materials increases. "Marching tetrahedral" approaches are similar in spirit and share the limitations of their marching cubes counterparts.

An approach attempting direct voxel meshing considers the voxel model not only as a collection of pixel values but as a hexahedral mesh. Therefore, a naive approach to generate a surface mesh from the voxel model consists of collecting the material boundary faces of this hexahedral volume mesh. Unfortunately, such a direct surface extraction contains non-manifold configurations that are potentially harmful in subsequent processing steps.

Delaunay-based methods of mesh generation construct a Delaunay triangulation or tetrahedralization of the input domain. Current, Delaunay-based methods are highly robust and come with strong theoretical guarantees on the resulting mesh quality but have not been adapted to generate conforming multi-material meshes from fill-fraction voxel data.

Embodiments of the present invention use voxel representations to generate robust and accurate multi-material meshes. More particularly, embodiments provide a mesh generation pipeline in a virtual fabrication environment that robustly generates high-quality triangle surface and tetrahedral volume meshes from multi-material fill-fraction voxel data. Multi-material topology is accurately captured while preserving characteristic feature edges of the model.

The different types of characteristic features in a multi-material mesh may be classified with the following terminology. The interface surfaces separating two materials are called "2-junctions". The set of edges where more than two materials meet are referred to as "1-junctions". Finally, the points where multiple 1-junctions meet are called "0-junctions". A key challenge in multi-material meshing is preserving such characteristic features while generating meshes of sufficiently high quality.

In one embodiment, an input domain for multi-material meshing is a three-dimensional voxel model with fill-fraction data. As a non-limiting example, the three-dimensional voxel model may represent a FinFET transistor, a 3D NAND memory module, or a MEMS device. It will be appreciated the three-dimensional voxel model may also represent other types of models other than those explicitly discussed herein. In contrast to classical voxel models storing just a single label per voxel, in the voxel model utilized by embodiments each voxel can store multiple materials per voxel as well as a floating point value specifying the fraction of volume occupied by each material. Two ordered integer IDs may be used to identify the materials. In one embodiment the first material ID is lower than the second. In one embodiment, example visualizations of the raw data as well as a visualization of the dominant material (where the fill-fraction>0.5) may be depicted in the virtual fabrication environment using color-coding (e.g.: blue corresponds to a low value, red to a high value).

Figure 11A:
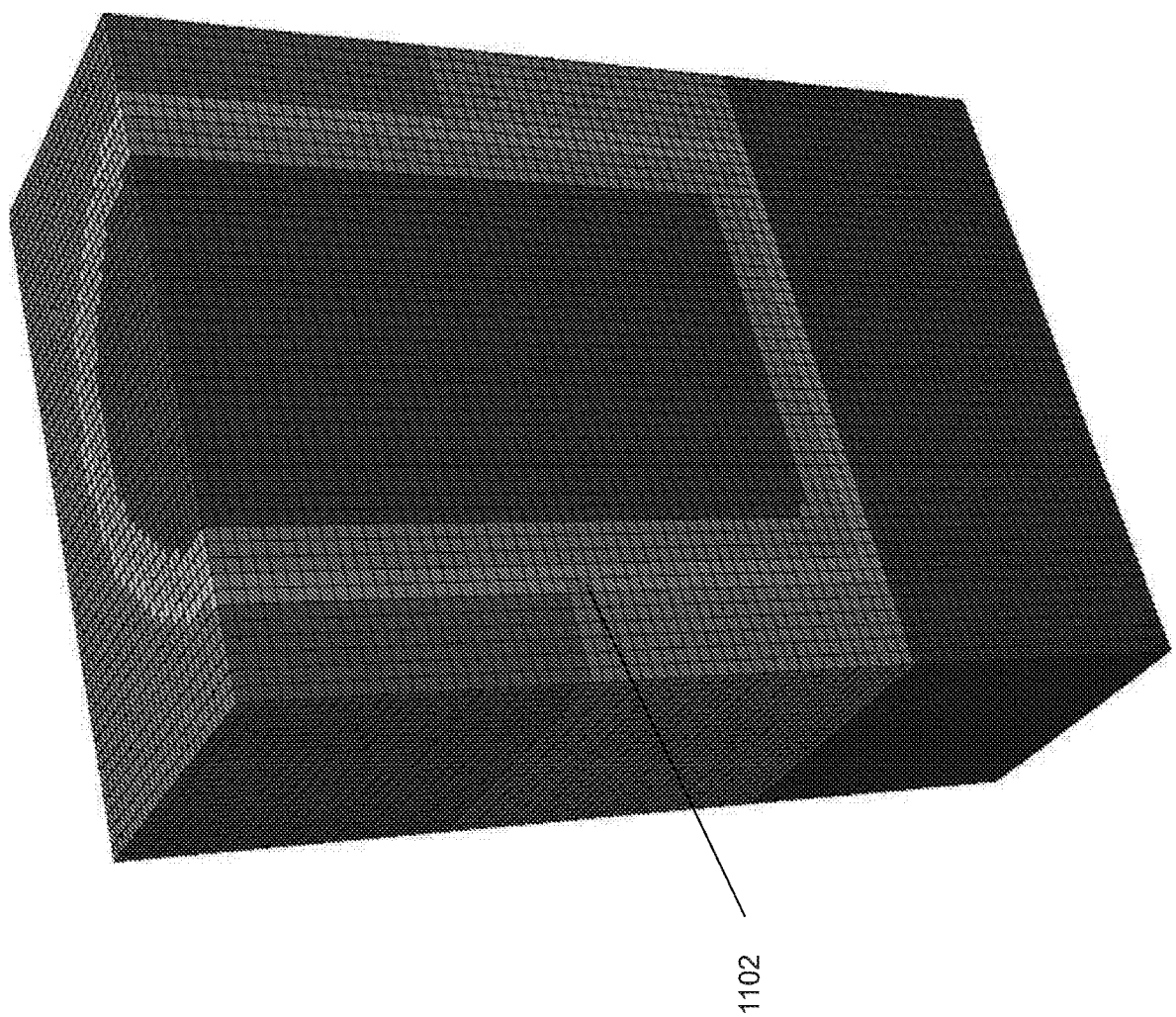
FIGS. 11A-D depict a multi-material fill-fraction voxel model.
Figure 11B:
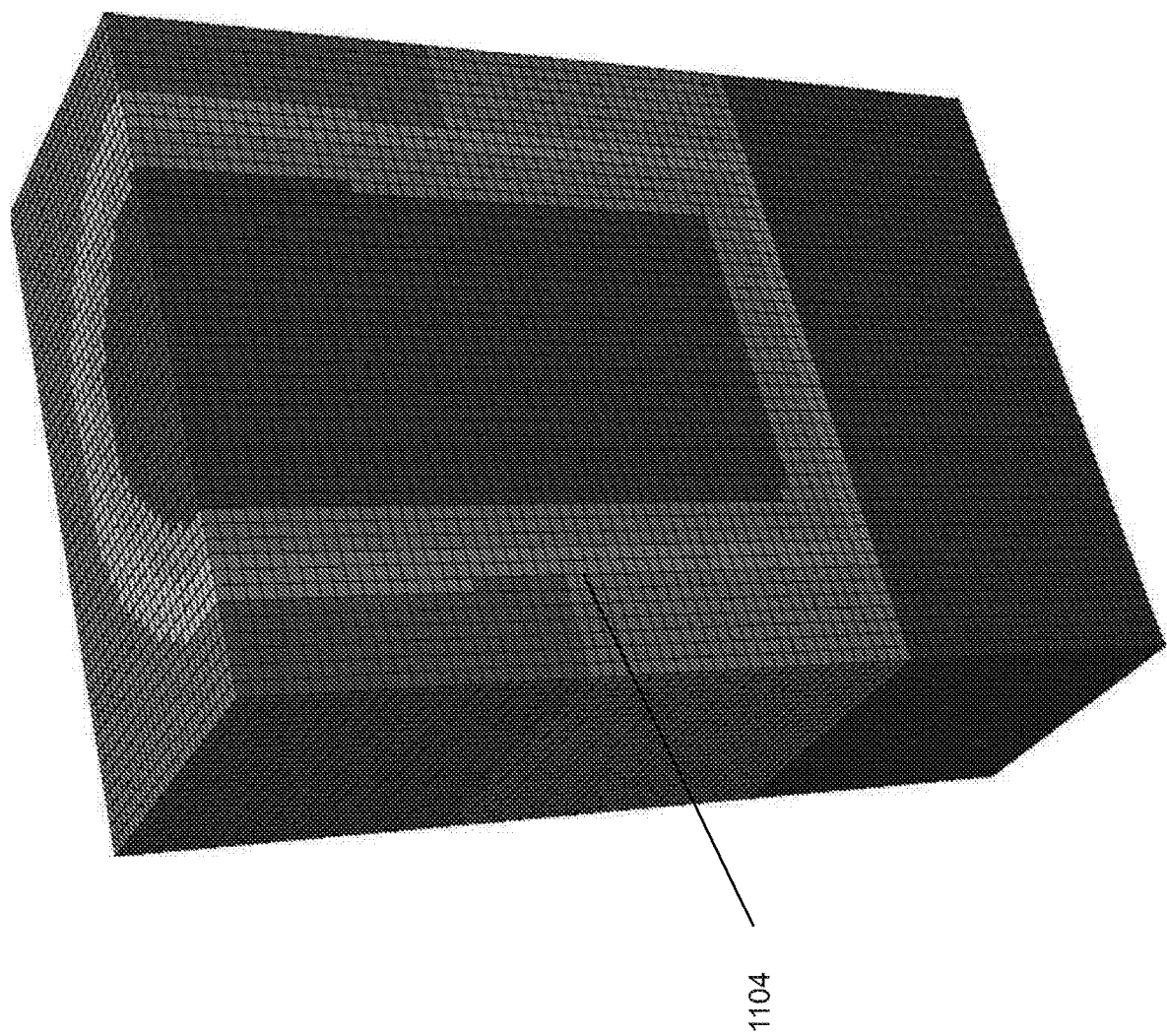
Figure 11C:
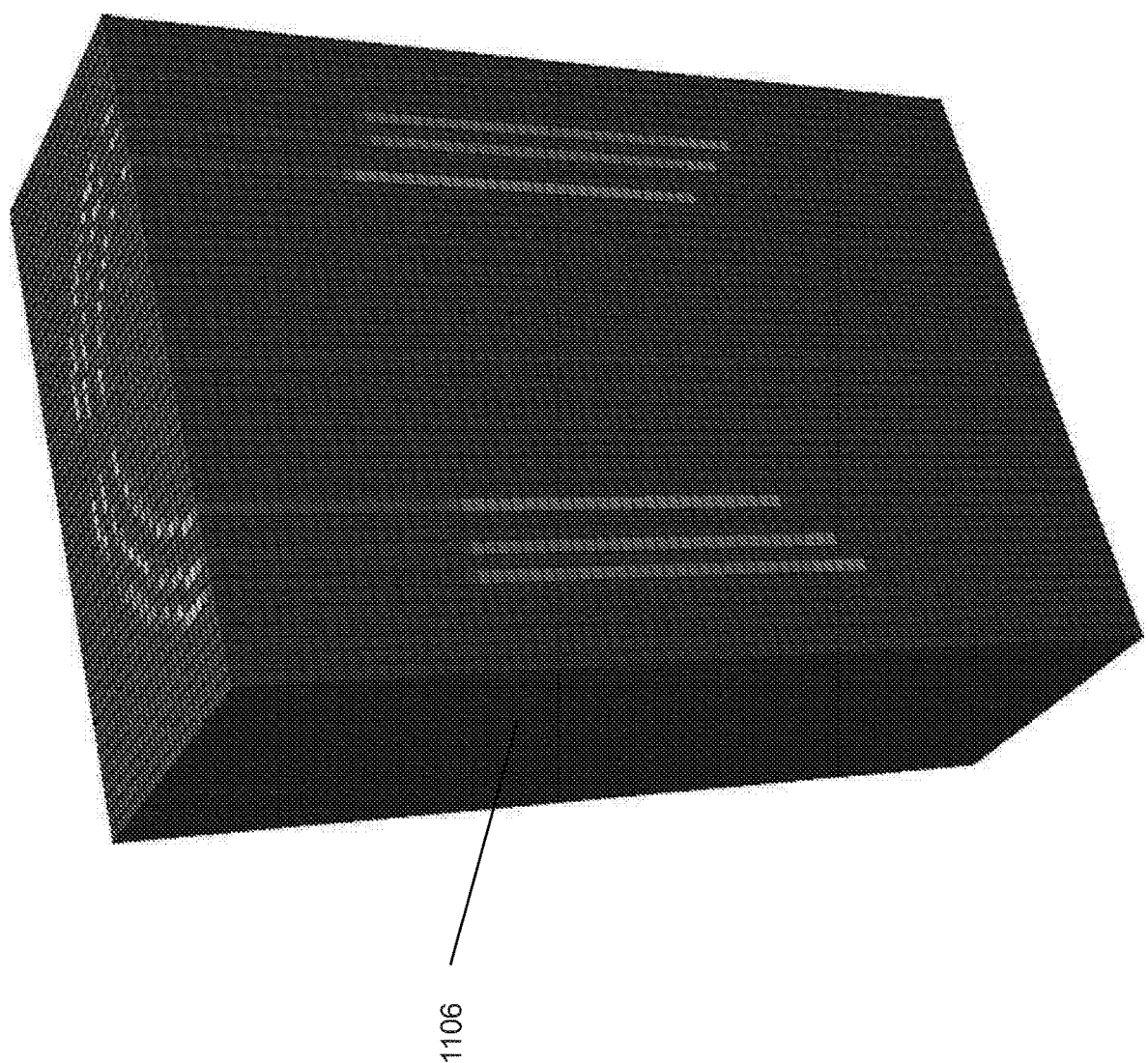
Figure 11D:
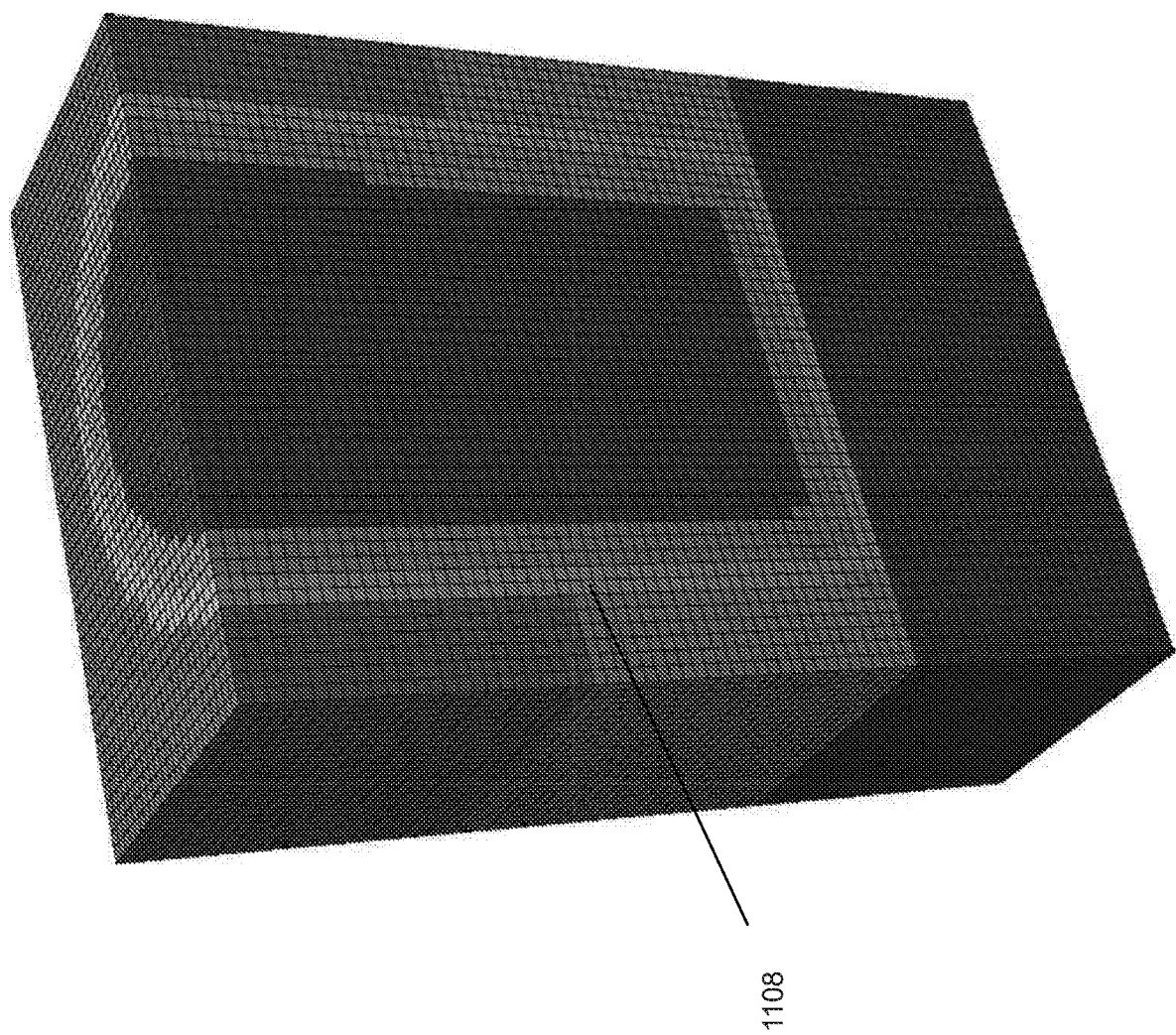

FIGS. 11A-D depict example visualizations produced by the virtual fabrication environment on a synthetic test case. The voxels are shown as a regular grid of uniform size and may be shown with an assigned color or other visual indicator according to material ID and/or fill-fraction. In FIGS. 11A and 11B each voxel depicts first and second material IDs, respectively. In one embodiment, with color coding or other indicators it can be seen that the assigned material ID of a particular voxel 1102, 1104 differs between the two images. FIG. 11C depicts the floating-point fill-fraction data for each voxel which represents the percentage of volume within this voxel assumed to be filled by each of the two materials, respectively. In some embodiments, indicators or shading 1106 may be used to represent the percentage. FIG. 11D depicts the dominant material for each voxel (e.g.: for each voxel in the grid the material ID with a fill-fraction value>0.5) chosen for visualization using an assigned color or other indicator per material ID. In contrast to FIGS. 11A and 11B, FIG. 11D provides a combined view of the data present in each voxel such as voxel 1108. It will be appreciated that the virtual fabrication environment may similarly display material ID and/or fill-fraction data for voxels containing information regarding more than two materials.

A particularly challenging aspect of handling input voxel data is the presence in the input voxel model data of thin layers and small features where the thin layers or small features are often just a few voxels thick, surfaces meeting at arbitrarily small angles (e.g., a dihedral angle lower than 10 degrees), as well as noise from previous process steps. In addition, models with a resolution as large as $3000^3$ are not uncommon, thereby posing a significant challenge in terms of scalability compared to traditional voxel models used in medical imaging where $256^3$ or $512^3$ are common sizes.

The meshing pipeline described herein addresses a number of challenges related to producing resulting meshes in the proper form for a virtual fabrication environment. One challenge in designing a mesh generation pipeline is to produce resulting output meshes with a closed multi-material triangle surface and tetrahedral volume meshes with conforming boundaries. On a very basic level, the meshes should be free of any artifacts such as intersections, foldovers, or singular vertices. The mesh element quality in the output mesh has to be sufficiently high for common downstream simulation applications, i.e., the mesh should not contain high aspect ratio triangles or degenerate tetrahedra which could degrade the accuracy of subsequent simulations. One particular important challenge is the reconstruction or estimation of features that are only partially represented in the original voxel model. The size of the mesh elements needs to be adaptable as it needs to be possible to prescribe certain minimum and maximum element sizes in certain spatial regions as well as for certain materials. Furthermore, the mesh generation pipeline should make it possible to generate curvature-adaptive meshes, as well as to control the rate of change of the element sizing.

Figure 12:
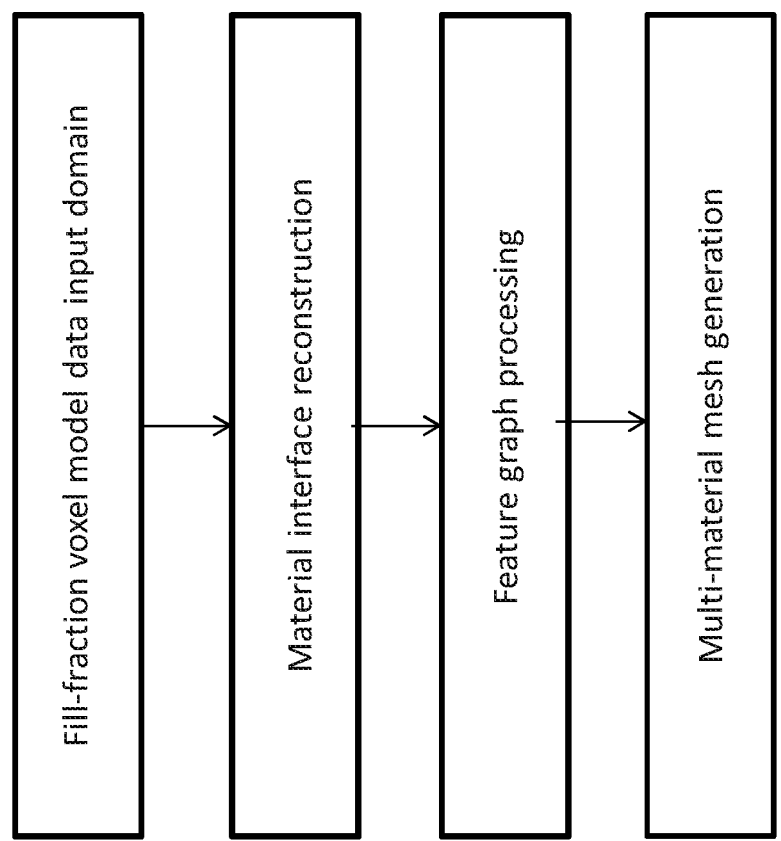
FIG. 12 depicts an exemplary mesh generation pipeline in an exemplary embodiment.

Embodiments address the above-described challenges associated with the input voxel data and resulting output meshes by providing a mesh generation pipeline that includes a scalable technique to extract multi-material interfaces, the ability to process and adapt the feature edges to be preserved, as well as a surface oracle combining material interfaces and the voxel model to make them amenable to robust Delaunay refinement and optimization methods. FIG. 12 depicts an exemplary mesh generation pipeline in an exemplary embodiment. The mesh generation pipeline includes a fill-fraction model voxel data input domain 1202 and three major processing steps in the pipeline: material interface reconstruction (MIR) 1204, feature graph processing 1206, and multi-material mesh generation 1208 performed with Delaunay refinement and optimization to generate a resulting output mesh.

The initial step of the mesh generation pipeline is performing MIR using the fill-fraction model voxel data. The result of the material interface reconstruction phase is an unstructured grid containing the volumetric cells representing the material interfaces as well as an initial feature graph (a set of connected edges embedded in 3D).

In order to reconstruct the material interface surfaces separating two materials, i.e., the 2-junctions, embodiments employ a significant modification of the MIR method described in "Visualization and Analysis-Oriented Reconstruction of Material Interfaces", *Computer Graphics Forum,* 2010, Meredith and Childs), the contents of which are incorporated herein by reference in their entirety. Conventionally the Meredith and Childs approach performs the reconstruction on a regular structured grid. Naturally, this approach is very limited in terms of scalability. Embodiments modify the Meredith and Childs approach to overcome some of its shortcomings, especially regarding scalability and robustness. Scalability in one embodiment is addressed by performing the reconstruction in a slicing manner, i.e., where the modeling engine examines the input voxel model from bottom to top and only considers a single slice (or sheet in the x and y dimensions) of voxels as well as its immediate neighbors for continuity. Since for fully-filled cells (i.e. cells where the volume fill-fraction is 100%) the modeling engine can simply query the voxel model, all filled voxel cells are removed from the grid. Only cells close to, or adjacent to, the material interface are kept, thereby drastically reducing the memory footprint. In some cases, in Meredith's conventional MIR method, the polyhedral cells produced can be degenerated and these degenerated cells don't allow for numerically robust location queries, e.g., to determine if a point is inside the cell or not. Embodiments address this issue of degenerated cells by removing them by tetrahedralizing the polyhedral cells. During the slicing process, the modeling engine also extracts the multi-material 1-junctions, (i.e., all edges whose adjacent cells have multiple materials are extracted) for the initial feature graph needed for the later stages of the mesh generation pipeline.

In another embodiment, MIR is performed as a fully-parallelized voxel modeling operation that reconstructs the interface only locally (per voxel) and later joins the reconstructed triangles into a single consistent material interface representation. This operation traverses the voxel model in parallel and examines each voxel and its local neighborhood, i.e., its surrounding voxels, in order to determine the local fill-fraction and material data and in turn to reconstruct the interface from this data using the same modified approach of Meredith and Childs described above. With this technique, the virtual fabrication environment only needs to store the necessary interface triangles separating two materials and not a full volumetric cell representation for the mesh generation pipeline. This drastically reduces the amount of data that needs to be stored since the number of interface triangles is smaller than the number of volumetric cells and storing an interface triangle takes less memory than storing tetrahedral cells. Accordingly, in contrast to the slicing embodiment for performing MIR discussed above, and conventional MIR techniques, this local reconstruction technique is significantly faster and requires drastically less memory.

The second step of the mesh generation pipeline provided by embodiments is to provide feature graph processing of the initial feature graph produced by the MIR stage of the mesh generation pipeline. The initial feature graph resulting from the material interface reconstruction stage represents the 0-junctions and 1-junctions but has several problems. It is sampled on a sub-voxel resolution, i.e., it contains many segments for each voxel cell, and is therefore much too dense for many applications in the virtual fabrication environment to use. A high-resolution feature graph is problematic since it significantly slows down subsequent processing and, more importantly, it results in a highly dense mesh after performing the final meshing step. Furthermore, the initial feature graph may contain some artifacts from the reconstruction such as arbitrarily small segments, tiny loops, or dangling edges. As a result, the initial feature graph produced by the MIR stage of the mesh generation pipeline cannot be used without modification as input to a Delaunay-based mesher (such as those used in the third stage of Applicant's mesh generation pipeline discussed further below). A Delaunay-based mesher needs an input feature graph that satisfies the Delaunay protecting ball criteria (i.e. two neighboring balls on the same segment of the graph need to intersect sufficiently, no ball intersects another ball on an unconnected segment of the graph, no three balls have a common intersection on the graph). In terms of topology, the input graph for a Delaunay-based mesher should be a proper cell complex, i.e., every 1-junction is limited by two 0-junctions, no duplicated or isolated points or cells. In terms of geometry, the input graph should be sparse but as-close-as-possible to original: it should not contain sub-voxel resolution loops, and no small or degenerate edges. In addition, the input graph should be curvature-adaptive, i.e. it should have large edges in co-linear regions and small edges in highly curved regions.

In order to obtain a feature graph satisfying the above criteria the mesh generation pipeline provided by embodiments performs several steps of feature graph processing. In one embodiment, as a first step, the initial feature graph produced by the MIR stage is repaired by removing duplicate vertices and edges, stitching together mismatched vertices (i.e., vertices that should be identical but that are separate due to numerical round-off errors), removing small isolated components, collapsing edges around acute angles, and removing dangling edges that are not part of a closed loop in the feature graph.

The main feature graph processing of the second stage of the mesh generation pipeline performs an adaptive re-sampling of the initial feature graph. In one embodiment, the adaptive re-sampling is controlled by a feature graph sizing field. A feature graph sizing field is a component that allows the sampling algorithm to determine the desired edge length for each point on the initial feature graph, i.e., it may provide an interface to return a sizing value for each point in 3-dimensional space. The feature graph sizing field is computed by the modeling engine in the virtual fabrication environment to account for curvature, distance to other 1-junctions, as well as geodesic distance between 0-junctions in the initial feature graph. To this end, a series of filters is applied that compute and store the corresponding values on the initial feature graph, e.g., a curvature filter is applied that computes the curvature for each vertex in the graph and stores this value as a vertex property (similarly filters are applied for the distance to other 1-junctions and the geodesic distance and stores resulting values as corresponding properties). In order to compute these values in a sufficiently accurate manner, a uniform sampling is first performed of the initial feature graph, i.e., the graph is sampled with a small and uniform edge size so that all edges in the graph are approximately of the same length. Put another way, the discrete feature graph sizing field is computed on a densely sampled graph where the feature graph sizing field is designed in such a manner that a feature graph re-sampled incorporating the sizing information automatically results in an adaptively sampled graph. The main re-sampling is then performed iteratively by splitting edges which are too long, collapsing edges that are too short, as well as a smoothing step with back-projection on the original graph. The predicate functions determining if an edge is too long or too small query the feature graph sizing field during each iteration. In order not to deviate too much from the initial feature graph, a back-projection on the original graph is performed at the end of each iteration, i.e., the vertices of the graph are projected to the closest location on the original feature graph. The result of this procedure is an adaptively sized feature graph.

In one embodiment in order to guarantee a feature graph sampling that adheres to the criteria required for subsequent Delaunay meshing, a final pass of feature graph resampling is performed. This final pass starts by determining maximum allowable sizes for 0-junctions and then creates a new sampling along the 1-junction connecting two 0-junctions. The variation in the distance of the sampling is limited so that a Lipschitz-continuous sample distribution is assured, i.e., so that the edge length only varies smoothly along the 1-junction. In addition, the sampling takes into account both the volumetric sizing field (assuring sufficient refinement in small feature areas) as well as potential user-defined size constraints prescribing a fine resolution in chosen areas. The final result of the second stage of the mesh generation pipeline is an adaptively-sized feature graph.

Figure 13A:
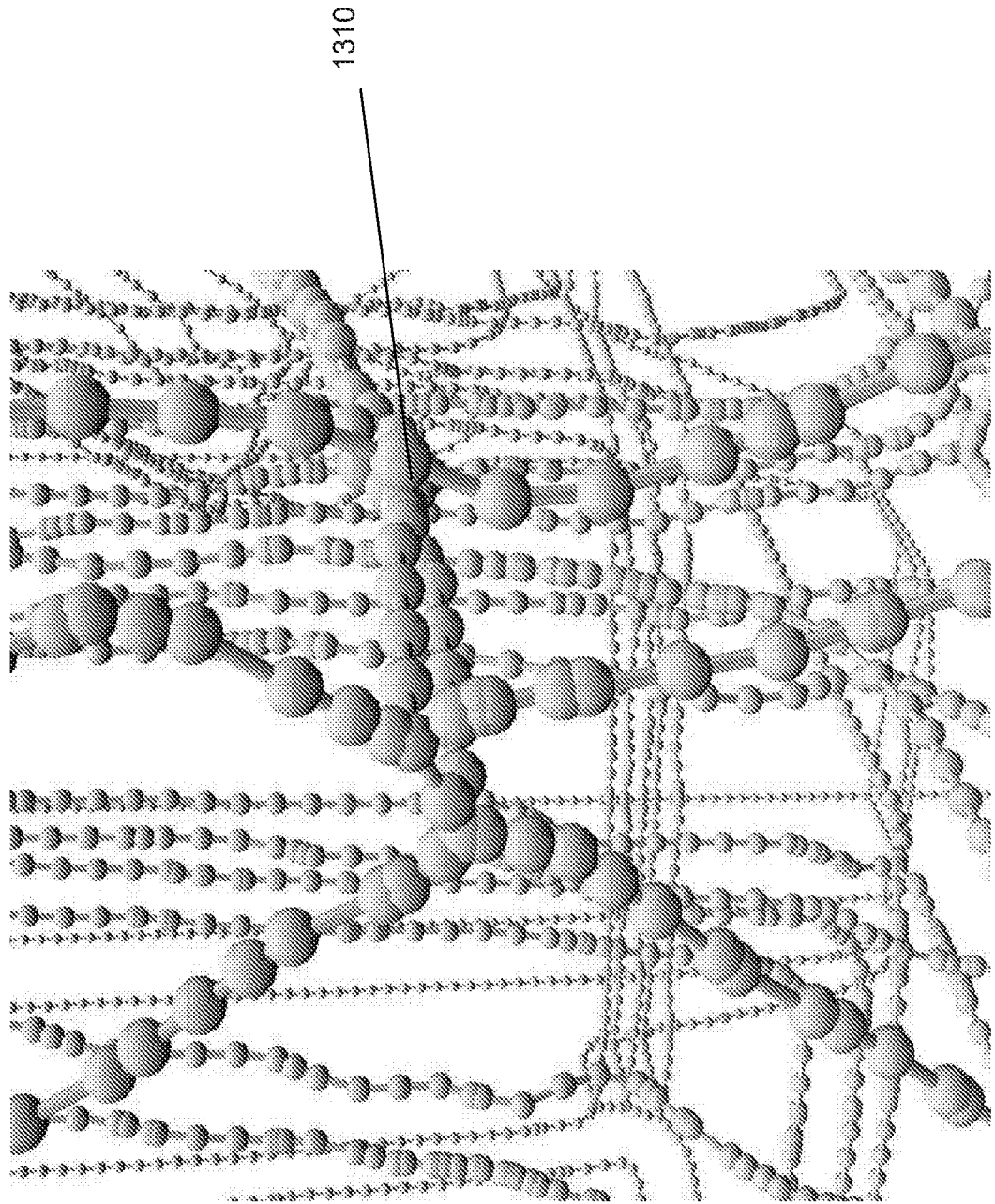
FIGS. 13A-C are example depictions of feature graphs produced by the virtual fabrication environment in an exemplary embodiment.
Figure 13B:
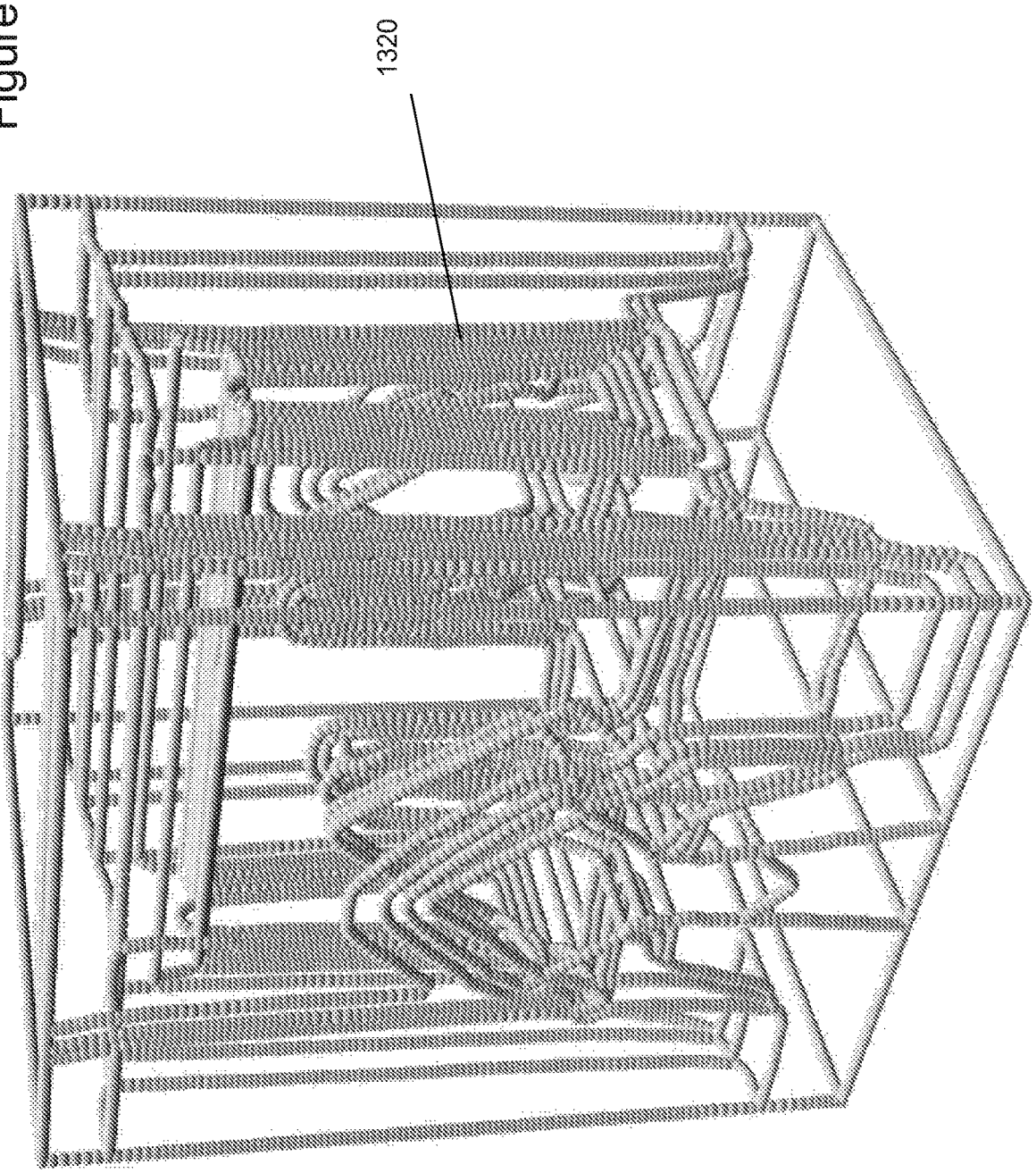
Figure 13C:
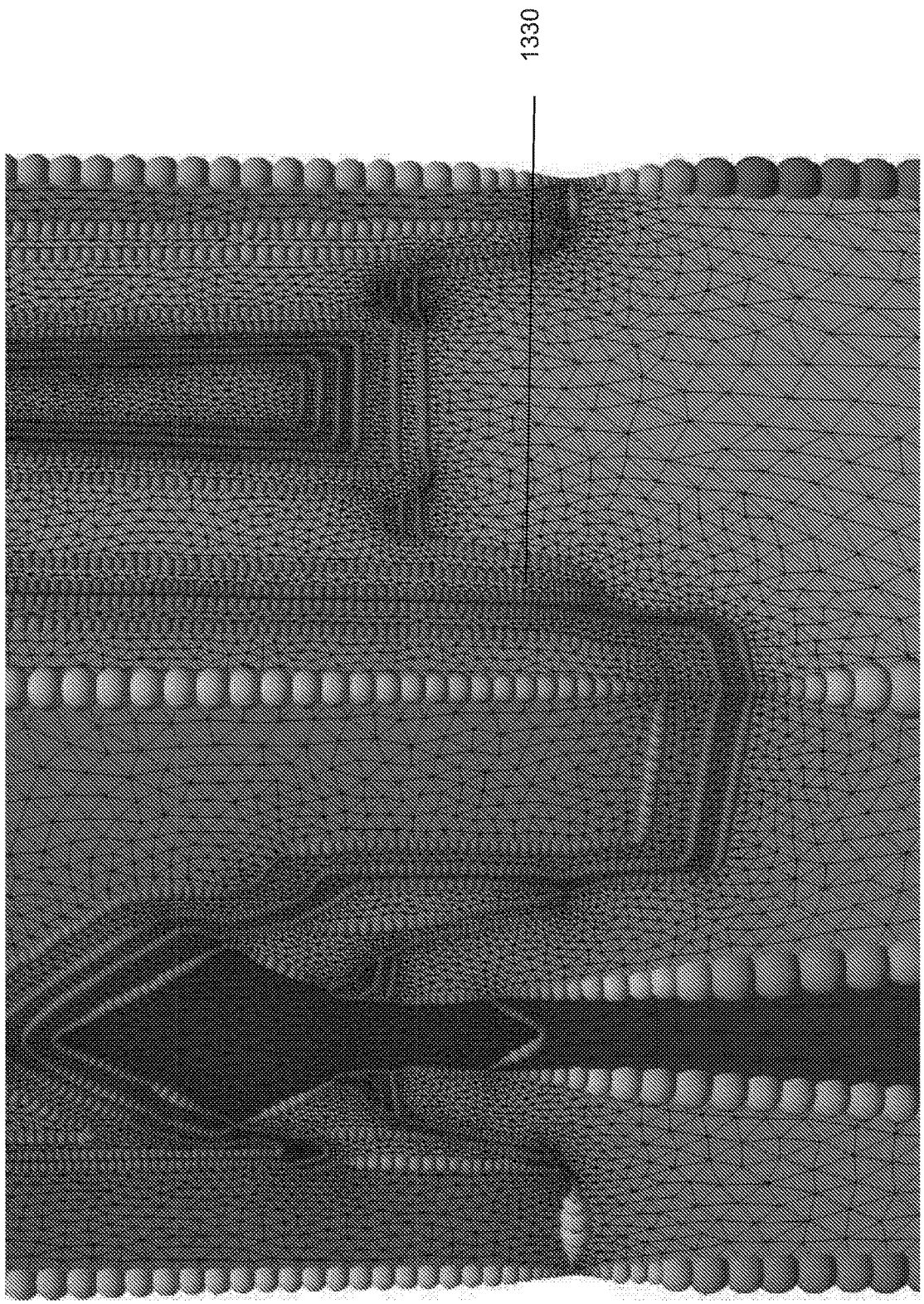

FIGS. 13A-C depict this adaptive re-meshing controlled by a feature graph sizing field in exemplary embodiments. FIG. 13A depicts an initial feature graph 1310 produced by the material interface reconstruction stage of the mesh generation pipeline in an exemplary embodiment. FIG. 13B depicts a cleaned-up (sparser) and uniformly sampled feature graph 1320 that can be used for feature graph sizing field computation in an exemplary embodiment. FIG. 13C depicts the adaptively sized feature graph 1330 and the resulting generated mesh.

The final stage of the mesh generation pipeline is the multi-mesh generation stage. In one embodiment, for the core mesh generation a robust Delaunay-based refinement and optimization process is relied upon. To this end, in one embodiment, the virtual fabrication environment provides a surface oracle, an interface/component that supports queries by the modeling engine during optimization operations performed during the final stage of the mesh generation pipeline for a material ID at a given point in space. The response to the query provides a correct label for the given point in space. More precisely, the surface oracle implements an interface used by the Delaunay refinement process in order to determine the material-ID at a given location (i.e. at a particular cell). The implementation of this query function essentially determines the multi-material topology of the resulting mesh. Embodiments use a combination of the underlying fill-fraction voxel model and the reconstructed interface surfaces to retrieve material IDs. For a given query point a first check is performed with the surface oracle to determine if the point is contained in one of the interface cells. This check may rely on an efficient spatial partitioning data structure such as a kD-tree. If the query point is contained in one of the interface cells, the corresponding label is returned. If the point is not in one of the interface cells, the underlying voxel model for the label is queried. The results of the queries (i.e. the material IDs) along with the information from the adaptively-sized feature graph are used by the virtual fabrication environment to perform a Delaunay triangulation to generate a multi-material mesh.

In an embodiment, the 3D mesh generation package of Computational Geometry Algorithms Library (CGAL) is used to perform a Delaunay refinement and optimization, i.e. to construct an initial 3D triangulation from the adaptively-sized feature graph and then to refine and optimize the triangulation until user-specified meshing criteria such as approximation accuracy or element size are met for a resulting output mesh. The resulting output mesh may then be used in the virtual fabrication environment or elsewhere to virtually fabricate and/or simulate the semiconductor device structure of interest.

In one embodiment, as part of the Delaunay refinement and optimization process thin layers of material may be detected to ensure proper representation in the final mesh. To this end, the mesh generation pipeline may prescribe a sufficiently small mesh element size in such layers, i.e., using a mesh sizing field. The volumetric mesh sizing field provides a desired mesh element size at a given point of space. The actual size returned by mesh sizing field may be specified by a user via a user interface provided by the virtual fabrication environment, may be previously specified by the software or may be dynamically determined based on examination of the voxel model data.

A key challenge prior to generating a multi-material mesh is how to detect thin layers. In one embodiment, the following procedure is employed. First all interface voxels are replaced with a special reserved material ID. Mathematical morphology operators are then applied (erosion and dilation) to the voxel model in order to detect thin layers. The detection is based on identifying regions that would vanish under erosion and dilation operations. The mesh sizing field keeps a reference to a sparse voxel model containing only the thin layer voxels and provides an interface to query whether or not a given point in space is within a thin layer. Finally, a sufficiently small element size (around the size of a single voxel) is prescribed for the mesh in thin layer regions.

An alternative implementation of the pipeline performs the reconstruction of the material interfaces "on the fly", i.e., during the Delaunay refinement process. In this case, the surface oracle directly queries the voxel model and only performs a local material interface reconstruction. The results of the local reconstruction can be cached to avoid repeated material interface reconstruction steps. Similarly, the feature graph extraction and processing can be done on the fly as well, during the Delaunay refinement process, e.g.: by tracing 1-junctions throughout the voxel model and incrementally adding new segments to the feature graph. Both of these variations significantly reduce the memory consumption and therefore allow the pipeline to generate meshes from large and complex voxel models.

Figure 14A:
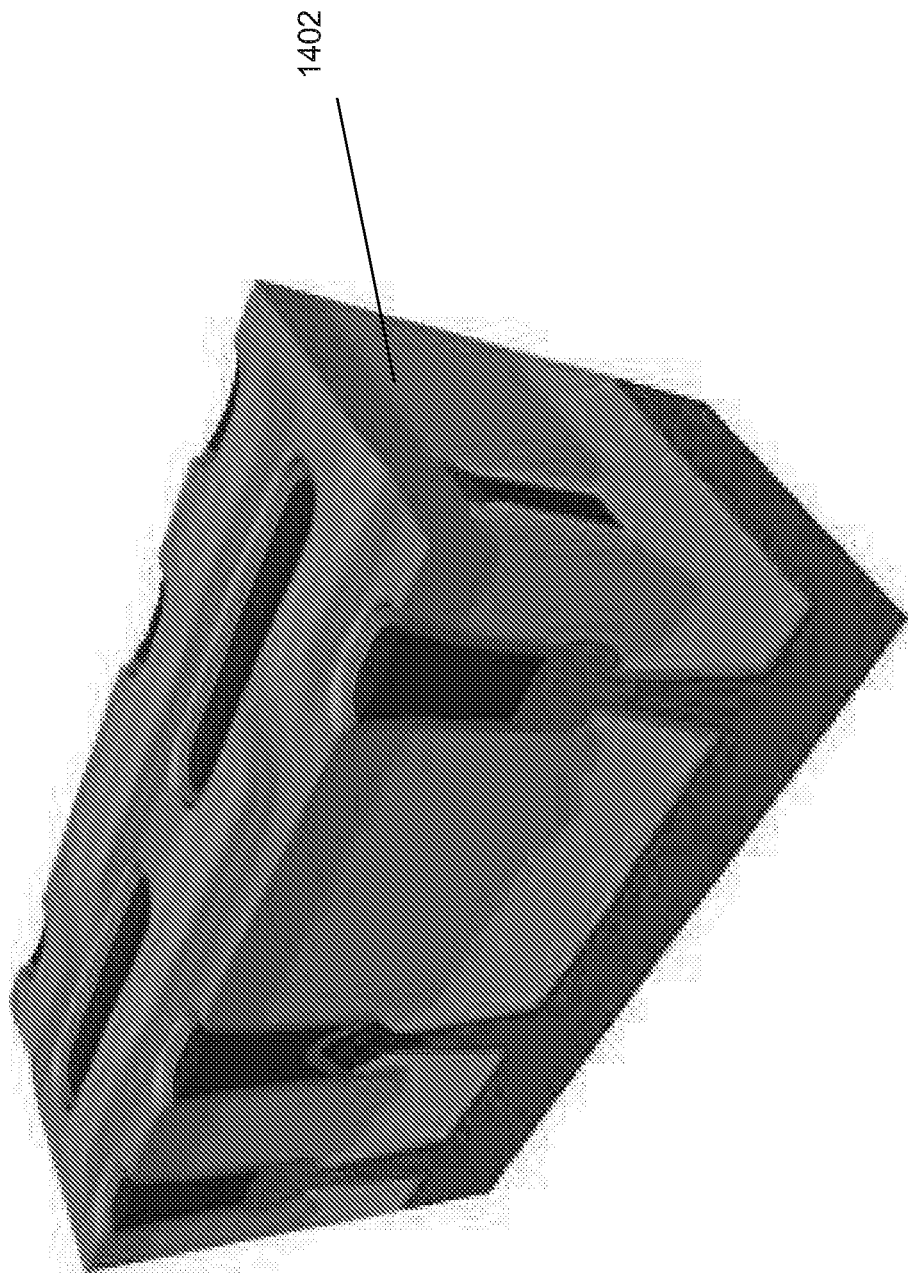
FIGS. 14A-C are example depictions of multi-material meshes of complex semiconductor devices produced by the virtual fabrication environment in an exemplary embodiment.
Figure 14B:
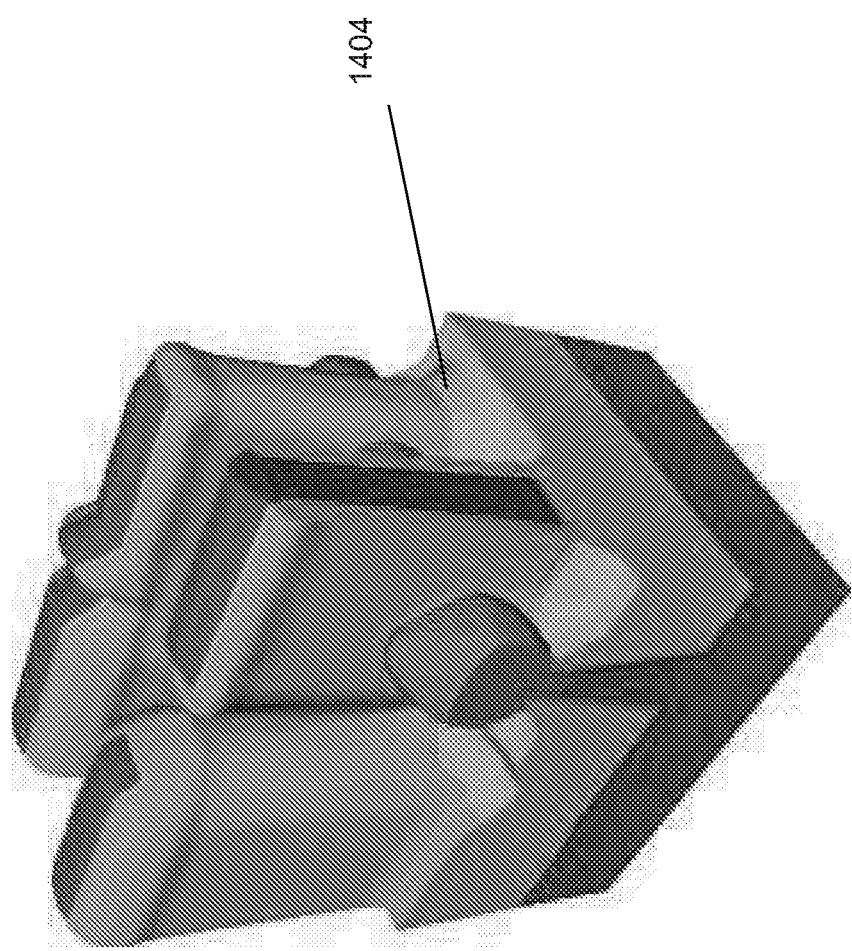
Figure 14C:
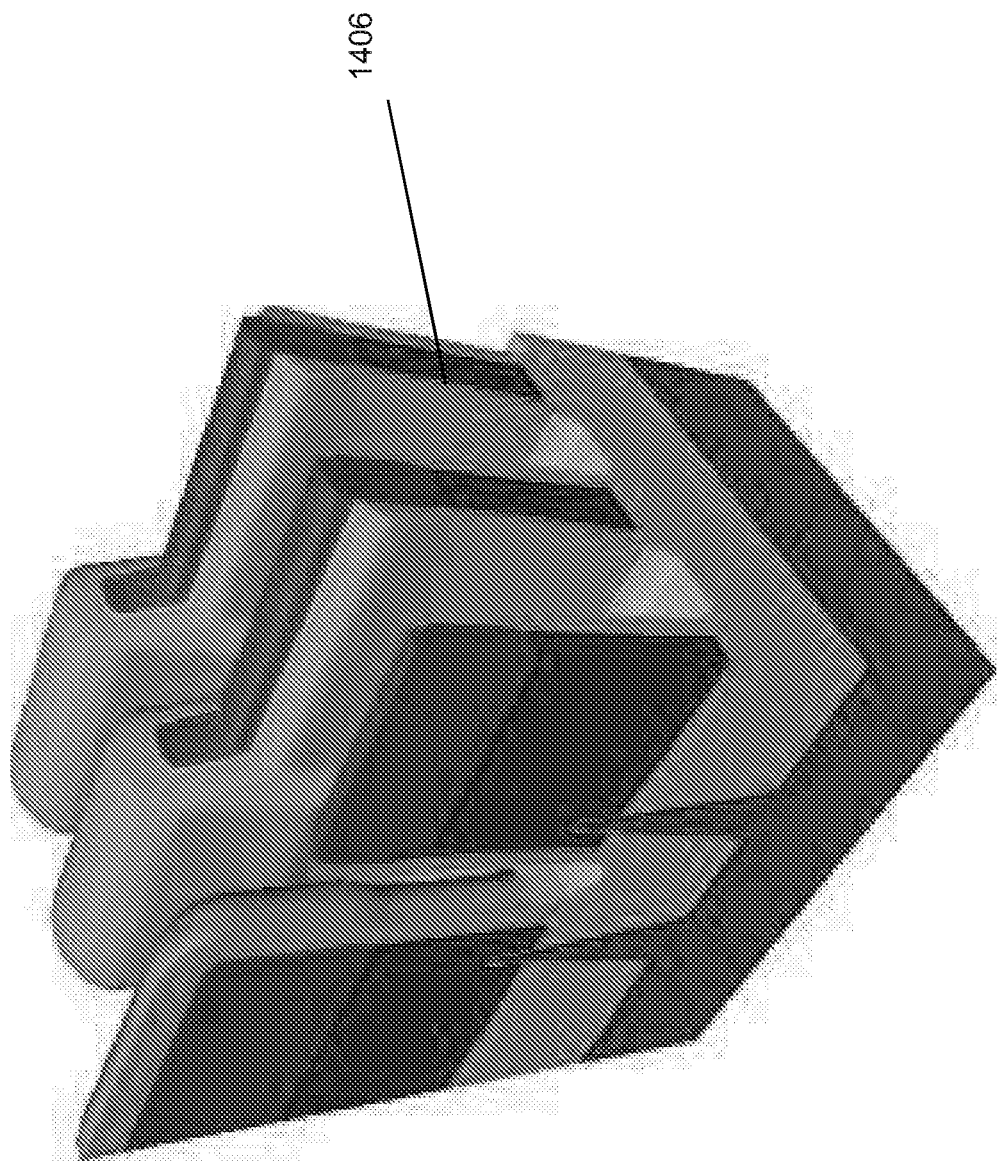

FIGS. 14A-C depict example visualizations produced in the virtual fabrication environment of multi-material meshes of complex semiconductor cases in an exemplary embodiment. Only the boundary surface triangles are rendered (without edges), and may be rendered according to an assigned material color. FIG. 14A depicts an exemplary 16 nm FinFET model. FIG. 14B depicts an exemplary 14 nm BFR model. FIG. 14C depicts an exemplary Gat-All-Around-FET model.

Figure 15A:
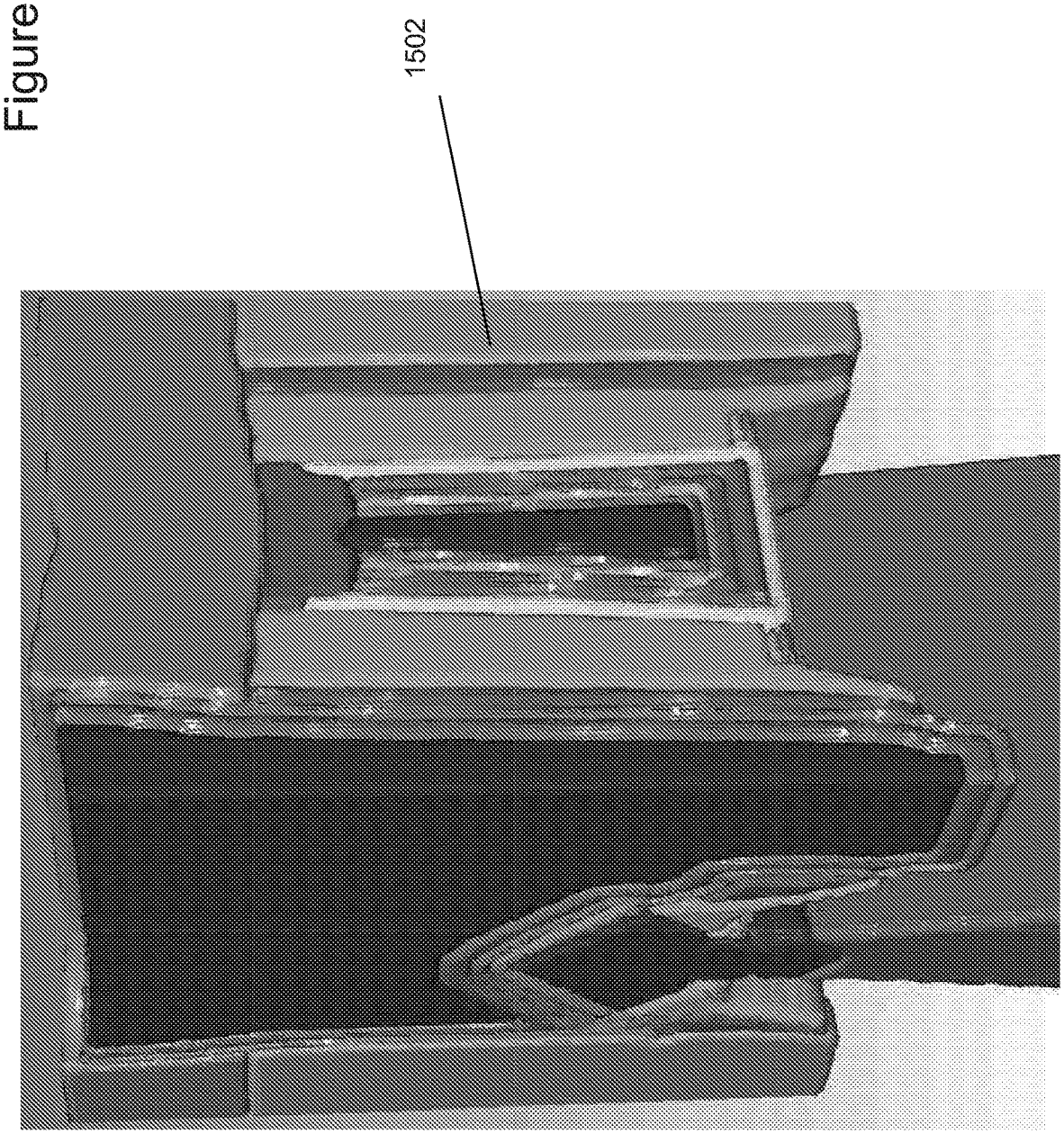
FIGS. 15A-D depict example views provided by the virtual fabrication environment of different mesh generation pipeline stages in an exemplary embodiment.
Figure 15B:
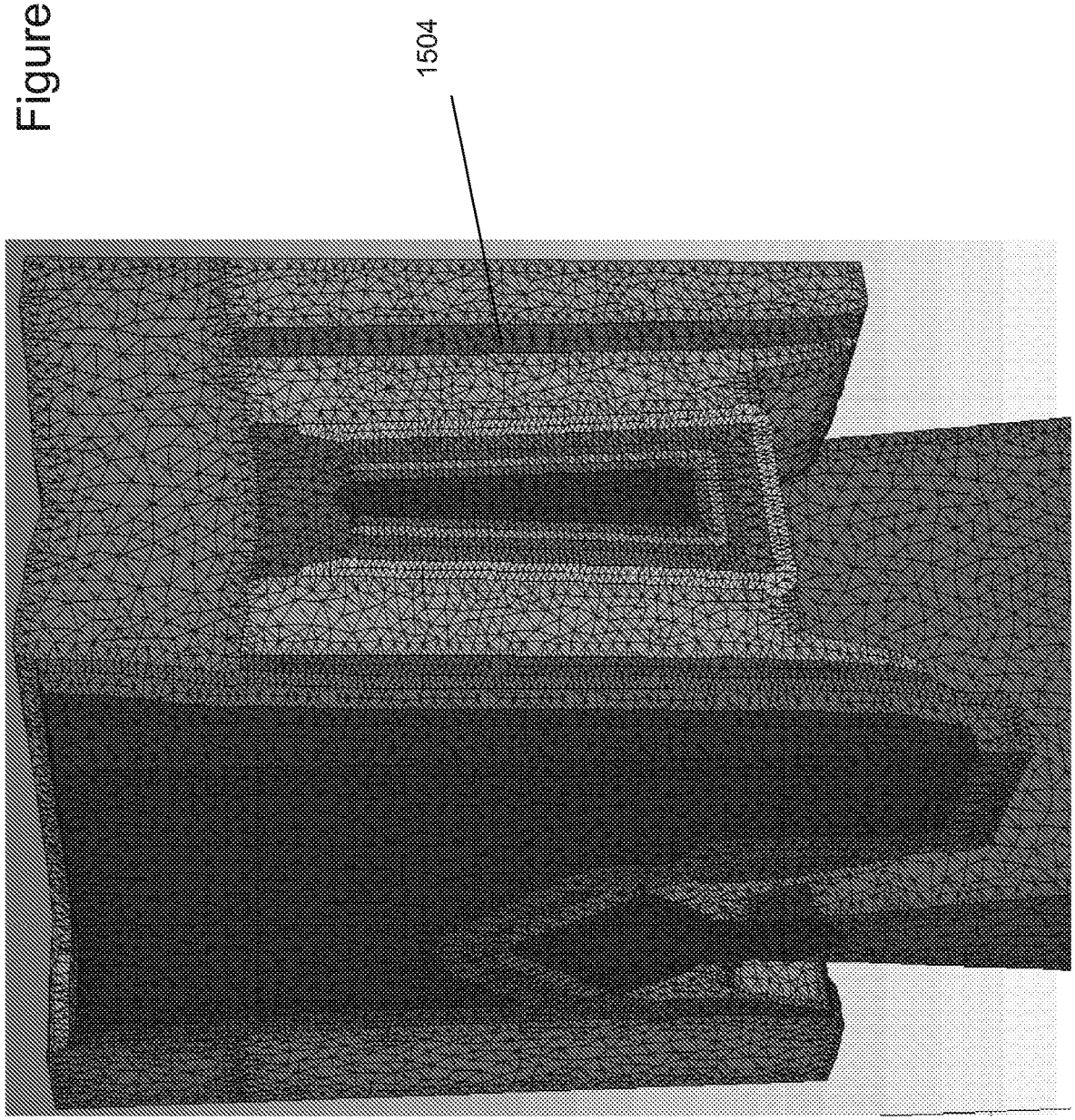
Figure 15C:
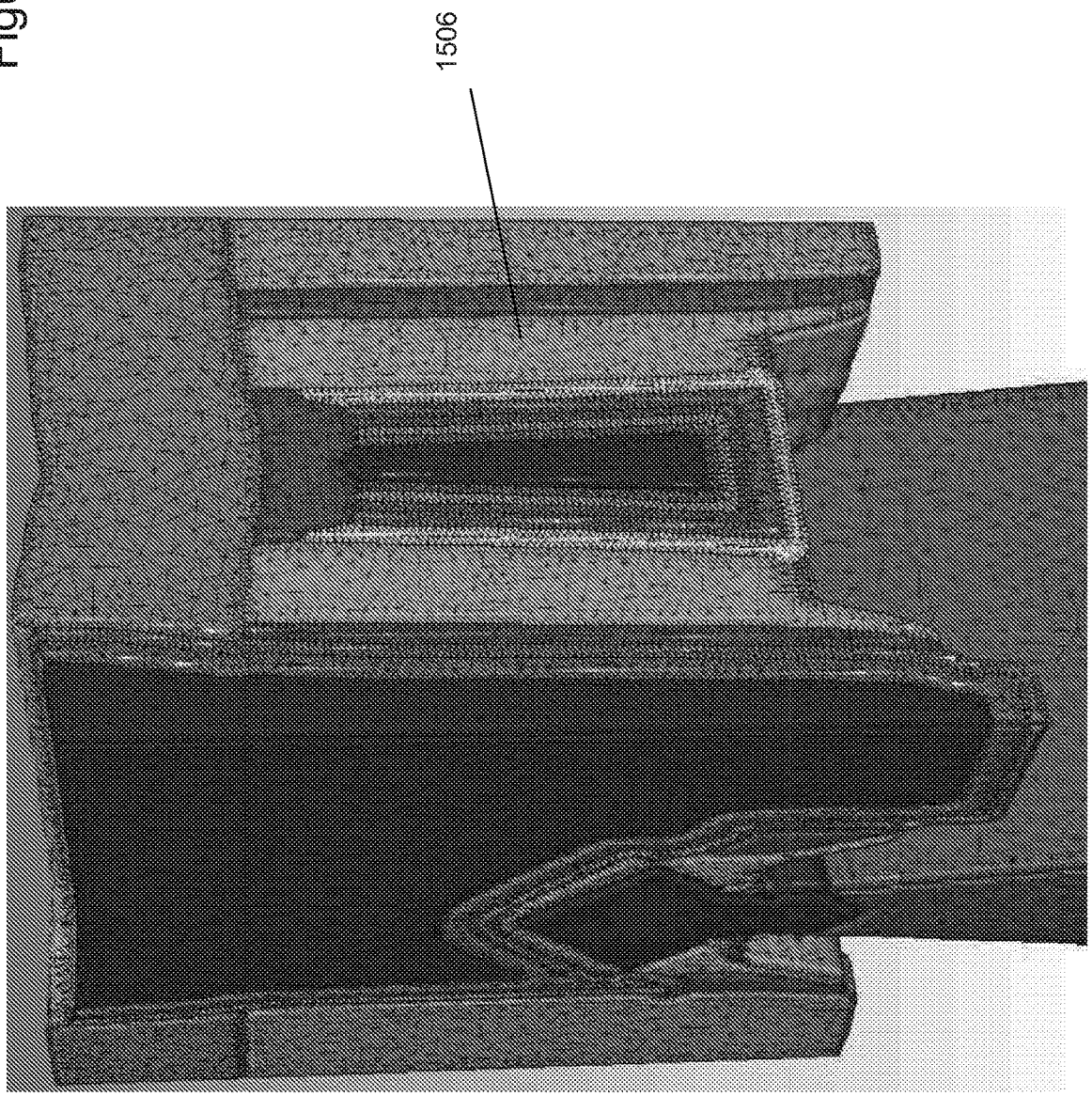
Figure 15D:
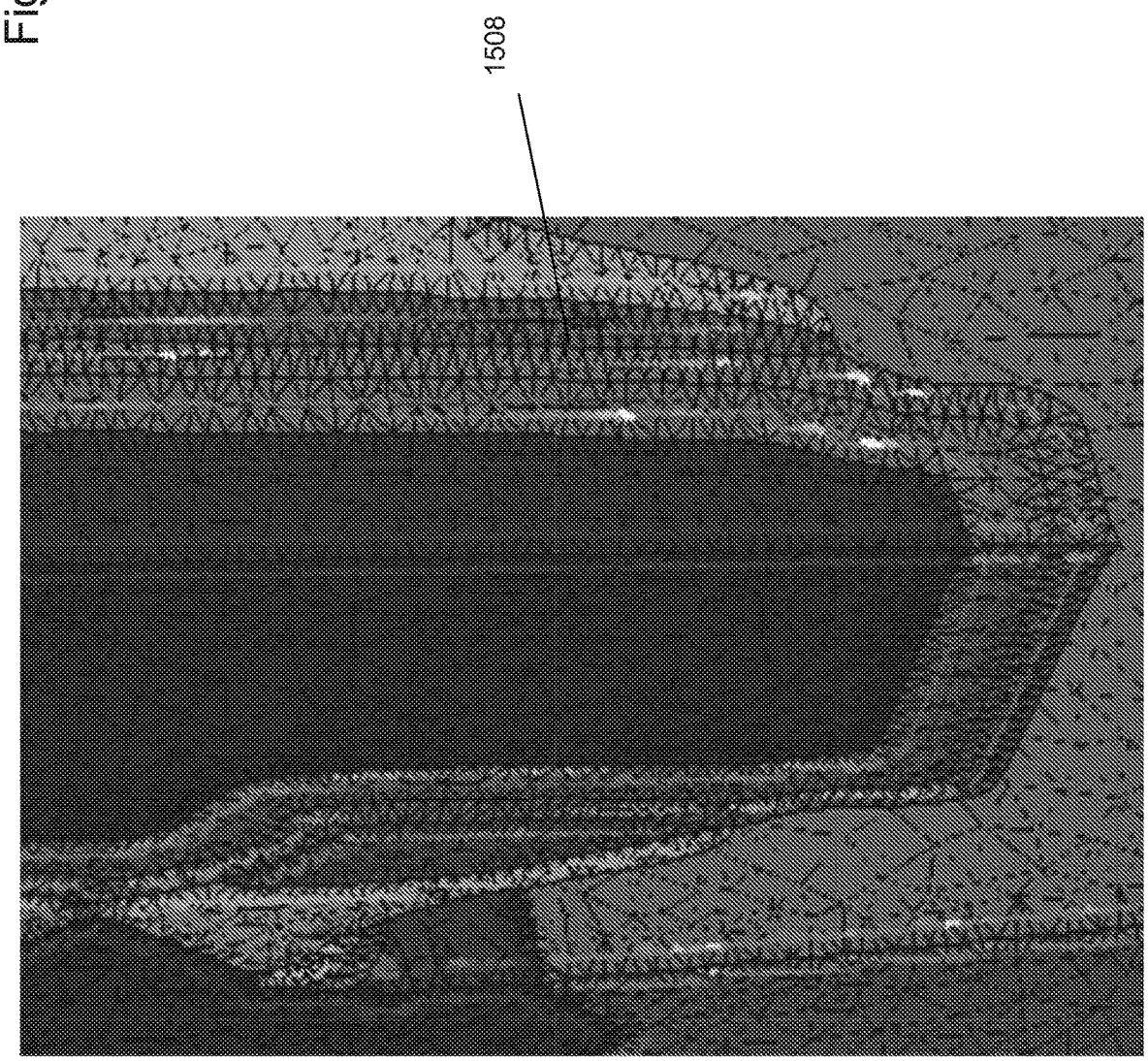

Besides robustness, the accurate representation of multi-material junctions is a major concern for multi-material mesh generation. The mesh generation pipeline described herein addresses these concerns as shown in FIGS. 15A-15D. The generated mesh accurately represents the geometry and topology of the underlying voxel model. FIG. 15A depicts a representation produced in the virtual fabrication environment of a voxel model of a FinFET example case. FIG. 15B depicts the generated mesh (uniform feature graph) in an exemplary embodiment. FIG. 15C depicts an overlay rendering of both the voxel model and the mesh in an exemplary embodiment. FIG. 15D depicts a close up view of FIG. 15C, demonstrating that the generated mesh closely matches the voxel model in an exemplary embodiment.

Figure 16:
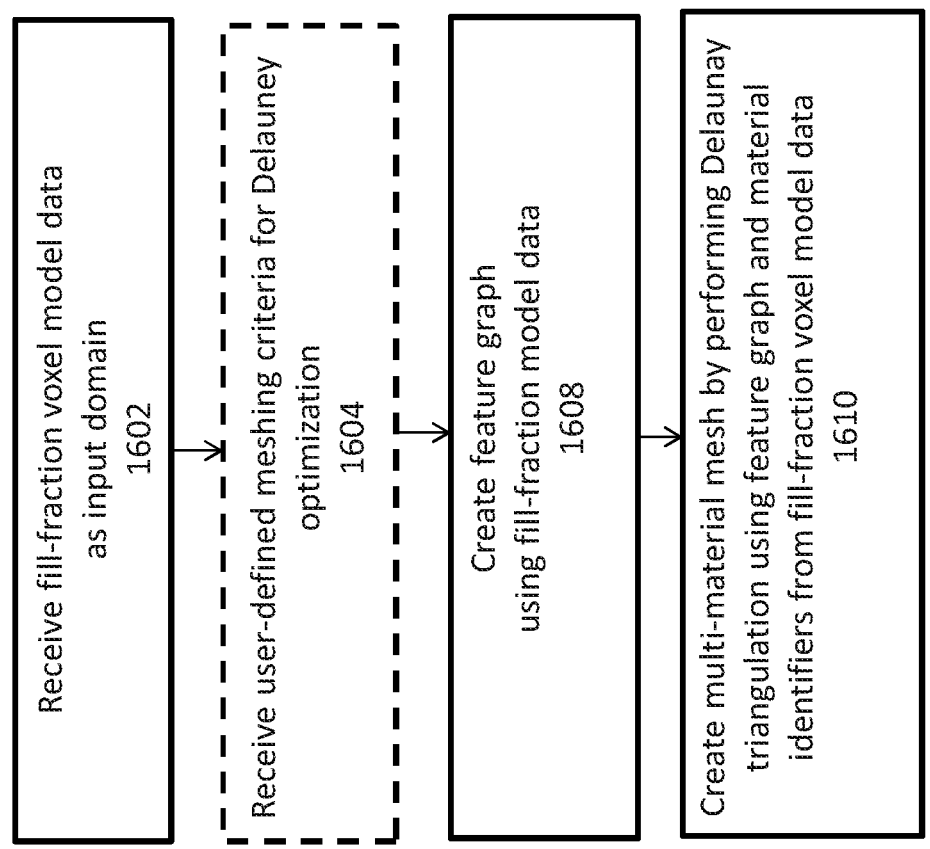
FIG. 16 depicts an exemplary sequence of steps performed to generate a multi-material mesh in an exemplary embodiment.

FIG. 16 depicts an exemplary sequence of steps performed to generate a multi-material mesh in an exemplary embodiment. The sequence begins with the virtual fabrication environment receiving fill-fraction voxel model data for a semiconductor device as an input domain (step 1602). A user interface may be provided by the virtual fabrication environment to enable the receipt of user-specified meshing criteria for a Delaunay optimization (step 1604). For example, the user may specify an approximation accuracy or an element size desired for a resultant output mesh. The virtual fabrication environment then creates a feature graph using fill-fraction voxel model data (step 1606). A multi-material mesh for the semiconductor device is then created by performing a Delaunay triangulation using the feature graph and material identifiers from the fill-fraction voxel model data.

FIG. 17 depicts an exemplary sequence of steps performed to generate a multi-material mesh in another exemplary embodiment. The sequence begins with the mesh generation pipeline of the virtual fabrication environment receiving fill-fraction voxel model data as an input domain (step 1702). Material interface reconstruction is then performed using the fill-fraction voxel model data to produce an initial feature graph (step 1704). The initial feature graph is then processed to produce an adaptively-sized feature graph (step 1706). The adaptively-sized feature graph is used together with retrieved cell material identifiers to create an initial Delaunay triangulation, thereby creating an initial tetrahedral volume mesh (step 1708). A refinement algorithm then refines the triangulation in an iterative manner using retrieved material identifiers and the mesh sizing field, i.e., it adds new elements until user-defined meshing criteria are met and the final output mesh is generated (step 1710). For example, the virtual fabrication environment may provide a user interface allowing a user to supply meshing criteria such as approximation accuracy or element size for a resultant output mesh.

In one embodiment, the adaptively sized feature graph is used together with the surface oracle to create the initial Delaunay triangulation/initial tetrahedral volume mesh. The surface oracle is used to determine whether material label query points are contained within interface cells. If the material label query point is contained within the interface cell, the material identifier is retrieved from the interface cell. If the material label query point is not contained within the interface cell, the material identifier is retrieved from the voxel model. The initial volume mesh is then refined using the Delaunay refinement algorithm of the CGAL library. This refinement algorithm uses the surface oracle as an interface and refines the triangulation in an iterative manner, i.e., it adds new elements until user-defined refinement settings/meshing criteria are met and the final output mesh is generated. It should be appreciated that other techniques for determining material IDs that do not rely on the use of a surface oracle are also within the scope of the present invention.

In an embodiment, if the fully-parallelized voxel modeling operation that reconstructs the interface only locally (per voxel) is used, the surface oracle uses a different method for supporting material label queries as required by the Delaunay refinement algorithm. In this case, a surface oracle based on ray-tracing a spatial subdivision structure (an axis-aligned bounding box tree, or AABB-tree) of the interface triangles is used. This is a standard component provided by the CGAL library.

As described herein, embodiments provide a multi-material mesh generation pipeline that robustly and accurately handles complex fill-fraction voxel models by using a Delaunay-based technique to handle the fill-fraction voxel model input domain. Key advantages are the robustness, accuracy, feature preservation, adaptive mesh sizing, as well as scalability to large and complex voxel models. These advantages are achieved through a combination of material interface reconstruction, feature graph processing, and Delaunay refinement and optimization techniques.

Portions or all of the embodiments of the present invention may be provided as one or more computer-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A non-transitory medium holding computer-executable instructions for performing multi-material mesh generation in a virtual fabrication environment, the instructions when executed causing at least one computing device to:
   receive, in the virtual fabrication environment, fill-fraction voxel model data of a semiconductor device as an input domain;
   create, in the virtual fabrication environment, an initial feature graph using the fill-fraction voxel model data;
   process the initial feature graph to generate a feature graph, wherein the initial feature graph is of higher resolution than the feature graph, wherein generating the feature graph comprises repairing the initial feature graph and performing a re-sampling of the initial feature graph based on a desired edge length for points on the initial feature graph, and wherein the feature graph satisfies criteria for an input for Delaunay triangulation; and
   generate, in the virtual fabrication environment, a multi-material mesh for the semiconductor device, the generating of the multi-material mesh performing the Delaunay triangulation using the feature graph and material identifiers from the fill-fraction voxel model data.

2. The medium of claim 1, wherein the instructions when executed further cause the at least one computing device to:
   receive user-defined refinement settings for the Delaunay triangulation; and
   perform the Delaunay triangulation iteratively until the user-defined meshing criteria are satisfied to optimize the multi-material mesh.

3. The medium of claim 1, wherein the instructions when executed further cause the at least one computing device to:
   perform material interface reconstruction on the fill-fraction voxel model data to extract interface cells and to generate the initial feature graph.

4. The medium of claim 3, wherein the instructions when executed further cause the at least one computing device to:
   extract multi-material 1-junctions during the material interface reconstruction.

5. The medium of claim 3 wherein the initial feature graph is repaired by performing one or more of removing duplicate vertices and edges, stitching together mismatched vertices, removing isolated components, collapsing around acute angles, or removing dangling edges, prior to producing an adaptively-sized feature graph.

6. The medium of claim 3, wherein the instructions when executed further cause the at least one computing device to:
   process the initial feature graph using a feature graph sizing field to produce an adaptively-sized feature graph,
   wherein the Delaunay triangulation is performed using the adaptively-sized feature graph.

7. The medium of claim 6 wherein the feature graph sizing field is computed based on curvature, distance to other 1-junctions and a geodesic distance between 0-junctions determined using the initial feature graph.

8. The medium of claim 6, wherein the instructions when executed further cause the at least one computing device to:
   determine whether each of a plurality of material label query points are contained within an interface cell,
   retrieve a material identifier from the interface cell when the query point is contained within the interface cell; and
   retrieve the material identifier from the fill-fraction voxel model data when the query point is not contained within the interface cell.

9. The medium of claim 8 wherein determining whether each of the plurality of material label query points are contained within an interface cell is performed using a surface oracle.

10. The medium of claim 1, wherein the instructions when executed further cause the at least one computing device to:
    detect thin layers of material represented in the fill-fraction voxel model data using a mesh sizing field prior to generating the multi-material mesh.

11. The medium of claim 10, wherein the instructions when executed further cause the at least one computing device to:
    replace all interface voxels with a reserved material ID,
    apply mathematical morphology operators to the voxel model to detect the thin layers; and
    apply a smaller element size in a thin layer region based on a detection of a thin layer when generating the multi-material mesh.

12. A computing device-implemented method for performing multi-material mesh generation in a virtual fabrication environment, comprising:
    receiving, in the virtual fabrication environment, fill-fraction voxel model data of a semiconductor device as an input domain;
    creating, in the virtual fabrication environment, an initial feature graph using the fill-fraction voxel model data;
    process the initial feature graph to generate a feature graph, wherein the initial feature graph is of higher resolution than the feature graph, wherein generating the feature graph comprises repairing the initial feature graph and performing a re-sampling of the initial feature graph based on a desired edge length for points on the initial feature graph, and wherein the feature graph satisfies criteria for an input for Delaunay triangulation; and
    generating, in the virtual fabrication environment, a multi-material mesh for the semiconductor device, the generating of the multi-material mesh performing the Delaunay triangulation using the feature graph and material identifiers from the fill-fraction voxel model data.

13. The method of claim 12, further comprising:
    receiving user-defined meshing criteria for the Delaunay triangulation; and performing the Delaunay triangulation iteratively until the user-defined meshing criteria are satisfied to optimize the multi-material mesh.

14. The method of claim 12, further comprising:
performing material interface reconstruction on the fill-fraction voxel model data to extract interface cells and to generate the initial feature graph.

15. The method of claim 14, further comprising:
extracting multi-material 1-junctions during the material interface reconstruction.

16. The method of claim 14, further comprising:
repairing the initial feature graph by performing one or more of removing duplicate vertices and edges, stitching together mismatched vertices, removing isolated components, collapsing around acute angles, or removing dangling edges, prior to producing an adaptively-sized feature graph.

17. The method of claim 14, further comprising:
processing the initial feature graph using a feature graph sizing field to produce an adaptively-sized feature graph, wherein the Delaunay triangulation is performed using the adaptively-sized feature graph.

18. The method of claim 17 wherein the feature graph sizing field is computed based on curvature, distance to other 1-junctions and a geodesic distance between 0-junctions determined using the initial feature graph.

19. The method of claim 17, further comprising:
determining whether each of a plurality of material label query points are contained within an interface cell,
retrieving a material identifier from the interface cell when the query point is contained within the interface cell; and
retrieving the material identifier from the fill-fraction voxel model data when the query point is not contained within the interface cell.

20. The method of claim 19 wherein determining whether each of the plurality of material label query points are contained within an interface cell is performed using a surface oracle.

21. The method of claim 12, further comprising:
detecting thin layers of material represented in the fill-fraction voxel model data using a mesh sizing field prior to generating the multi-material mesh.

22. The method of claim 21, further comprising:
replacing all interface voxels with a reserved material ID,
applying mathematical morphology operators to the voxel model to detect the thin layers; and
applying a smaller element size in a thin layer region based on a detection of a thin layer when generating the multi-material mesh.

23. A system for performing multi-material mesh generation in a virtual fabrication environment, comprising:
at least one simulation application executable by a computing device;
at least one computing device equipped with a processor and configured to generate a virtual fabrication environment for semiconductor device structures, the virtual fabrication environment configured to:
receive fill-fraction voxel model data of a semiconductor device as an input domain;
receive user-defined meshing criteria for a Delaunay triangulation;
create an initial feature graph using the fill-fraction voxel model data,
process the initial feature graph to generate a feature graph, wherein the initial feature graph is of higher resolution than the feature graph, wherein generating the feature graph comprises repairing the initial feature graph and performing a re-sampling of the initial feature graph based on a desired edge length for points on the initial feature graph, and wherein the feature graph satisfies criteria for an input for the Delaunay triangulation; and
perform the Delaunay triangulation iteratively using the feature graph and material identifiers from the fill-fraction voxel model data until the user-defined meshing criteria are satisfied to generate and optimize a multi-material mesh for the semiconductor device, wherein the at least one simulation application is configured to accept the generated multi-material mesh as an input.

* * * * *